US010261670B2

(12) United States Patent
den Haring et al.

(10) Patent No.: US 10,261,670 B2
(45) Date of Patent: Apr. 16, 2019

(54) ZOOMING USER INTERFACE FOR A MATERIAL HANDLING CONTROL SYSTEM

(71) Applicant: Atronix Acquisition Corp., Norcross, GA (US)

(72) Inventors: David den Haring, Atlanta, GA (US);
Tim Barringer, Suwanee, GA (US);
Tab Fischbach, Duluth, GA (US);
Shixin Zeng, Lawrenceville, GA (US)

(73) Assignee: Atronix Acquisition Corp., Norcross, GA (US)

( * ) Notice: Subject to any disclaimer, the term of this patent is extended or adjusted under 35 U.S.C. 154(b) by 0 days.

(21) Appl. No.: 14/659,438

(22) Filed: Mar. 16, 2015

(65) Prior Publication Data

US 2015/0261422 A1    Sep. 17, 2015

Related U.S. Application Data

(60) Provisional application No. 61/953,132, filed on Mar. 14, 2014.

(51) Int. Cl.
*G06F 13/00*  (2006.01)
*G06F 15/00*  (2006.01)
*G06F 3/0484*  (2013.01)

(52) U.S. Cl.
CPC .. *G06F 3/0484* (2013.01); *G06F 2203/04806* (2013.01)

(58) Field of Classification Search
CPC .......................... G06F 9/4443; G05B 19/4185
USPC .......................... 715/700, 760, 762–765, 741
See application file for complete search history.

(56) References Cited

U.S. PATENT DOCUMENTS

| 5,963,884 A * | 10/1999 | Billington .............. G21C 17/00 |
| | | 702/56 |
| 6,188,831 B1 * | 2/2001 | Ichimura .............. H04N 5/9261 |
| | | 360/72.1 |
| 7,900,153 B2 | 3/2011 | Damodarart et al. |
| 8,260,736 B1 * | 9/2012 | Lear ........................ G06N 5/02 |
| | | 706/46 |
| 2004/0054428 A1 | 3/2004 | Sheha et al. |

(Continued)

FOREIGN PATENT DOCUMENTS

WO     2012/056337 A1    5/2012

OTHER PUBLICATIONS

International Search Report and Written Opinion issued by the ISA/US, Commission for Patents, dated Jun. 26, 2015, for related International Application No. PCT/US2015/020823; 9 pages.

(Continued)

*Primary Examiner* — Kevin Nguyen
(74) *Attorney, Agent, or Firm* — Stites & Harbison, PLLC; David W. Nagle, Jr.; James R. Hayne

(57) ABSTRACT

A zooming user interface for a material handling control system is provided. A method carried out by at least one processor may include providing a representative diagram of a material handling system for display on a display at a first zoom level, receiving a user request for a change in a zoom level of at least a portion of the representative diagram, and in response to receiving the user request providing the at least a portion of the representative diagram of the material handling system for display on the display at a second zoom level. The at least a portion of the representative diagram may include additional content at the second zoom level.

26 Claims, 40 Drawing Sheets

(56) References Cited

U.S. PATENT DOCUMENTS

| | | | |
|---|---|---|---|
| 2005/0021513 A1 | 1/2005 | Vedula et al. | |
| 2006/0277463 A1* | 12/2006 | Mann | G06F 9/4443 715/210 |
| 2006/0277479 A1* | 12/2006 | Britt | G06F 9/4443 715/760 |
| 2012/0144334 A1 | 6/2012 | Reichert | |
| 2012/0254792 A1 | 10/2012 | Husoy et al. | |
| 2013/0132867 A1* | 5/2013 | Morris | G06F 3/048 715/759 |
| 2014/0336786 A1* | 11/2014 | Asenjo | G05B 19/4185 700/17 |

OTHER PUBLICATIONS

International Preliminary Report on Patentability issued by the International Bureau of WIPO, dated May 3, 2016, for related International Application No. PCT/US2015/020823; 6 pages.
International Preliminary Report on Patentability issued by the International Bureau of WIPO, dated Aug. 11, 2016, for related International Application No. PCT/US2015/020823; 5 pages.
European Patent Office, Extended European Search Report cited in corresponding Application No. EP15761172, dated Sep. 21, 2017.

* cited by examiner

| Timestamp | Message | Unit |
|---|---|---|
| 2012-10-18 09:56:35 | OFF: I141-1 Access door 1 is open | Crane 1 |
| 2012-10-18 09:56:22 | ON: I141-1 Access door 1 is open | Crane 1 |
| 2012-10-18 09:54:32 | OFF: I142-10 Emergency off from cabin door 1 | Crane 1 |
| 2012-10-18 09:54:26 | ON: I142-10 Emergency off from cabin door 1 | Crane 1 |
| 2012-10-18 09:53:48 | OFF: I142-10 Emergency off from cabin door 1 | Crane 1 |
| 2012-10-18 09:53:46 | ON: I142-10 Emergency off from cabin door 1 | Crane 1 |
| 2012-10-18 09:53:37 | OFF: I142-10 Emergency off from cabin door 1 | Crane 1 |
| 2012-10-18 09:51:39 | ON: I141-1 Access door 1 is open | Crane 1 |
| 2012-10-18 09:51:35 | OFF: I141-1 Access door 1 is open | Crane 1 |
| 2012-10-18 09:51:26 | ON: I141-1 Access door 1 is open | Crane 1 |
| 2012-10-18 09:47:27 | OFF: I141-1 Access door 1 is open | Crane 1 |
| 2012-10-18 09:47:23 | ON: I141-1 Access door 1 is open | Crane 1 |
| 2012-10-18 09:47:21 | OFF: I141-1 Access door 1 is open | Crane 1 |
| 2012-10-18 09:47:14 | ON: I141-1 Access door 1 is open | Crane 1 |
| 2012-10-18 09:47:08 | OFF: I142-10 Emergency off from cabin door 1 | Crane 1 |
| 2012-10-18 09:46:58 | ON: I142-10 Emergency off from cabin door 1 | Crane 1 |
| 2012-10-18 09:46:34 | OFF: I142-10 Emergency off from cabin door 1 | Crane 1 |
| 2012-10-18 09:45:48 | ON: I142-10 Emergency off from cabin door 1 | Crane 1 |
| 2012-10-18 09:45:08 | OFF: I141-1 Access door 1 is open | Crane 1 |
| 2012-10-18 09:44:57 | ON: I141-1 Access door 1 is open | Crane 1 |
| 2012-10-18 09:44:04 | OFF: I141-1 Access door 1 is open | Crane 1 |
| 2012-10-18 09:43:56 | ON: I141-1 Access door 1 is open | Crane 1 |
| 2012-10-18 09:09:22 | OFF: Wrapper Safety Gate Operator Side Open - Close gate | Kaufman Wrapper |
| 2012-10-18 09:08:00 | OFF: Film Tearout | Kaufman Wrapper |
| 2012-10-18 09:07:30 | ON: Wrapper Safety Gate Operator Side Open - Close gate | Kaufman Wrapper |
| 2012-10-18 09:07:30 | ON: Film Tearout | Kaufman Wrapper |
| 2012-10-18 08:40:45 | OFF: Wrapper Safety Gate Operator Side Open - Close gate | Kaufman Wrapper |
| 2012-10-18 08:39:01 | OFF: Film Tearout | Kaufman Wrapper |
| 2012-10-18 08:39:01 | ON: Wrapper Safety Gate Operator Side Open - Close gate | Kaufman Wrapper |
| 2012-10-18 08:37:45 | ON: Film Tearout | Kaufman Wrapper |

Merge Monitor

Remaining for Wave

0%  0  3

| Lane | Area Number | Wave Number | Stop Number | Carton Present | Release State | Last Barcode | Lane Release |
|---|---|---|---|---|---|---|---|
| Merge Lane 1 | BL-ML1 | 3 | 6 | | | 42575704 | 5 |
| Merge Lane 2 | 114-ML2 | 4 | 1 | ☐ | ☐ | 61927341 | 1 |
| Merge Lane 3 | WR-ML3 | 3 | 6 | ☐ | ☐ | 18603542 | 6 |
| Merge Lane 4 | 113-ML4 | 4 | 1 | ☐ | ☐ | 17026460 | 2 |
| Merge Lane 5 | 110-ML5 | 3 | 6 | ☐ | ☐ | 50321760 | 3 |
| Merge Lane 6 | 111-ML6 | 3 | 5 | | | 72078861 | 4 |

Current Mode
Wave/Stop Mode
[Last Wave Mode]

|  | Actual | Tolerance |
|---|---|---|
| Consecutive No Reads | 0 | |
| Consecutive Cartons Not On File | 0 | [22] ⊕⊖ |

Current Mode 270
Auto
[Auto]

272 — Carton Present PE / Full PE

| | Release State | Carton Present PE | Full PE |
|---|---|---|---|
| BL-ML1 | ☐ | ☐ | ☐ |
| 114-ML2 | ☐ | ☐ | ☐ |
| WR-ML3 | ☐ | ☐ | ☐ |
| 113-ML4 | ☐ | ☐ | ☐ |
| 110-ML5 | ☐ | ☐ | ☐ |
| 111-ML6 | ☐ | ☐ | ☐ |

FIG. 31

ZOOMING USER INTERFACE FOR A MATERIAL HANDLING CONTROL SYSTEM

CROSS-REFERENCE TO RELATED APPLICATIONS

This application claims the benefit of U.S. Provisional Application No. 61/953,132, filed Mar. 14, 2014, the disclosure of which is expressly incorporated by reference herein.

FIELD

The present disclosure relates to a user interface for industrial automation and monitoring applications, and more particularly to a zooming user interface for a material handling control system.

BACKGROUND AND SUMMARY

Conventional material handling systems, including manufacturing and process control systems, include one or more user interfaces that allow an operator to monitor and control the system. Human machine interfaces (HMIs) provide a graphics-based visualization of a control and monitoring system. HMIs include a computer system that signals and controls the state of industrial automation equipment based on operator input. An HMI often communicates with one or more programmable logic controllers (PLCs) to monitor the control system and to provide control input. Conventional HMIs may include a monitor including a keypad or a touchscreen for operator input.

Conventional HMIs include numerous individual windows displayed one at a time on the monitor or in an overlapping or tiled arrangement on the monitor. Each window may include selectable tabs or buttons that when selected lead to another window which has additional selectable tabs and buttons. The nested windows of conventional HMIs are often cumbersome and difficult to navigate by the operator.

According to an exemplary embodiment of the present disclosure, a method carried out by at least one processor is provided. The method includes providing a representative diagram of a material handling system for display on a display at a first zoom level, and receiving a user request for a change in a zoom level of at least a portion of the representative diagram. The method further includes, in response to receiving the user request, providing the at least a portion of the representative diagram of the material handling system for display on the display at a second zoom level. The at least a portion of the representative diagram includes additional content at the second zoom level. The method further includes receiving status data associated with at least one device of the material handling system, and providing the status data for display on the display with the representative diagram based on the zoom level of the representative diagram.

According to another exemplary embodiment of the present disclosure, a system is provided including a display and at least one processor in communication with the display. The at least one processor is operative to provide a representative diagram of a material handling system for display on the display at a first zoom level, receive a user request for a change in a zoom level of at least a portion of the representative diagram, and in response to receiving the user request provide the at least a portion of the representative diagram of the material handling system for display on the display at a second zoom level. The at least a portion of the representative diagram includes additional content at the second zoom level. The at least one processor is further operative to receive status data associated with at least one device of the material handling system and provide the status data for display on the display with the representative diagram based on the zoom level of the representative diagram.

According to yet another exemplary embodiment of the present disclosure, a non-transitory computer-readable medium is provided including executable instructions. When executed by at least one processor, the executable instructions cause the at least one processor to provide a representative diagram of a material handling system for display on a display at a first zoom level, receive a user request for a change in a zoom level of at least a portion of the representative diagram, and in response to receiving the user request provide the at least a portion of the representative diagram of the material handling system for display on the display at a second zoom level. The at least a portion of the representative diagram includes additional content at the second zoom level. The executable instructions further cause the at least one processor to receive status data associated with at least one device of the material handling system and provide the status data for display on the display with the representative diagram based on the zoom level of the representative diagram.

BRIEF DESCRIPTION OF THE DRAWINGS

The above-mentioned and other features and advantages of the invention, and the manner of attaining them, will become more apparent and the disclosure itself will be better understood by reference to the following description taken in conjunction with the accompanying drawings, wherein:

FIG. 6 illustrates the zooming user interface of FIG. 4 zoomed in to the alarm history portion;

FIG. 20 illustrates the zooming user interface of FIG. 19 zoomed in to a maintenance portion displaying maintenance schedules for the material handling system;

FIG. 31 illustrates the zooming user interface of FIG. 29 zoomed in to the merge monitor portion;

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

Figure 1:
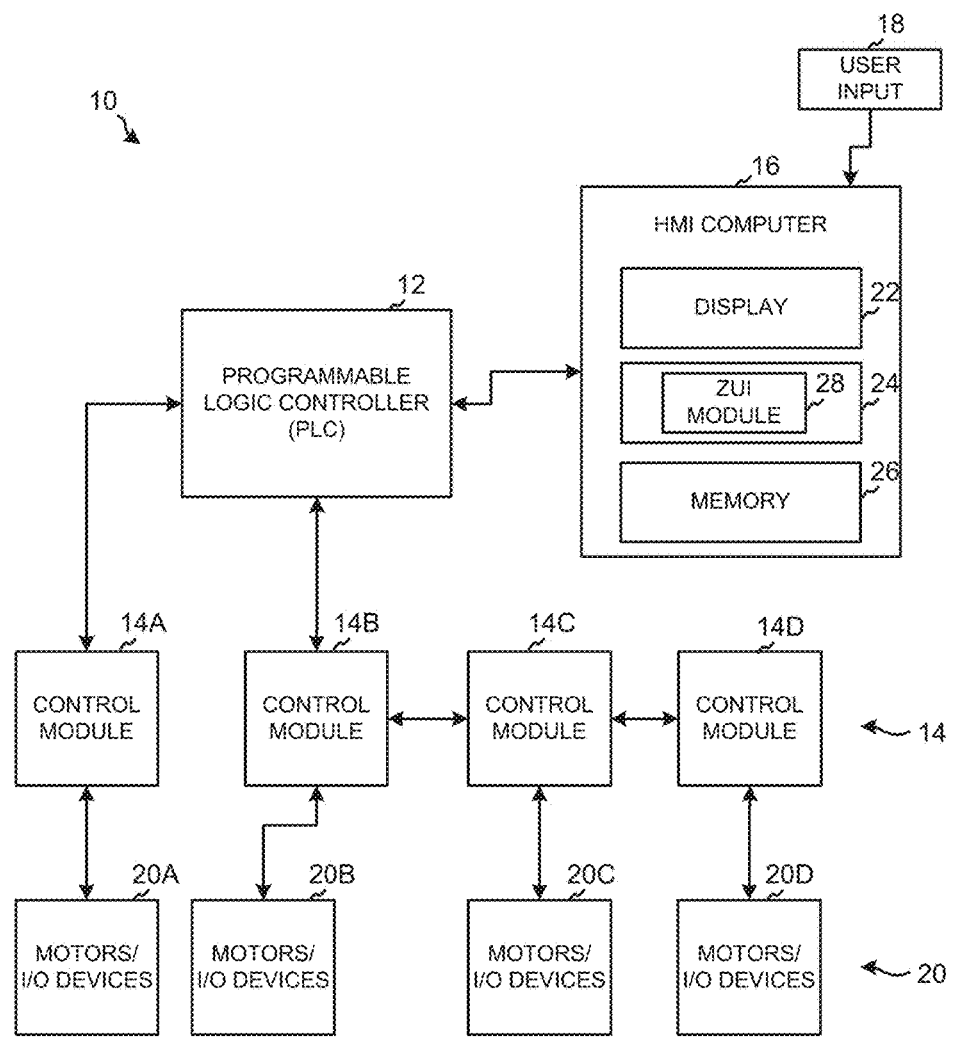
FIG. 1 is a block diagram of an exemplary material handling control system according to some embodiments including a programmable logic controller, an HMI computer station, one or more control modules, and input/output devices.

The embodiments disclosed herein are not intended to be exhaustive or to limit the disclosure to the precise forms disclosed in the following detailed description. Rather, the embodiments are chosen and described so that others skilled in the art may utilize their teachings.

The present disclosure relates to a zooming user interface for visualizing and controlling material handling processes using semantic zooming. Exemplary material handling processes include manufacturing, distribution, storage, cleaning, preparation, disposal, packaging, and other suitable processes. The zooming user interface includes a software or firmware module executed on a computer system used for HMI (human machine interface) and/or SCADA (supervisory control and data acquisition) applications, for example.

Semantic zooming is used for displaying different zoom (e.g., magnify) levels of a graphical display. In semantic zooming, a graphical object may change appearance or shape as it changes size due to zooming, and thus the object has a different displayed representation for different spatial scales. In the illustrated embodiment, a birds-eye visualization of a material handling facility including a material handling system is displayed initially, and an operator may then zoom into a particular area of the material handling system. Semantic zooming provides more detail and content (e.g., graphical objects) as the displayed area is further zoomed to greater zoom levels. As such, the visualizations of each graphical object may be displayed differently at each zoom level with semantic zooming as greater detail is provided with greater zoom levels.

In one embodiment, the panning and zooming nature of the zooming user interface may increase the likelihood of encouraging users to explore and learn the HMI application by making use of the human brain's capacity for spatial awareness. In some embodiments, users are able to jump from one area of the material handling system diagram to the next using familiar selectable hyperlinks and/or translucent hotspots.

In some embodiments, the zooming user interface module interfaces with SQL databases such as MySQL and PLCs (programmable logic controllers) such as Allen Bradley PLCs, for example. The zooming user interface module has tools to facilitate an engineer (or a power user) to develop and maintain applications. In one embodiment, the zooming user interface runs on Windows or Linux. In another embodiment, the zooming user interface runs on Android, iOS, or other suitable operating systems.

In some embodiments, the zooming user interface provides one or more of the following: uses a panning and zooming user interface to visualize and control material handling processes; connects to SQL databases such as Oracle, PostgreSQL, MySQL and SQLite, for example; connects to PLCs such as Allen Bradley, Siemens and Modicon, for example; provides built-in security; has a small footprint and simple installation; includes simple development tools included in the box; allows several users to monitor/edit the same application from different locations using portals (i.e., an engineer may run the zooming user interface on his laptop and then open a portal to a remotely running zooming user interface to both monitor and edit the project); and implements a login requirement.

In some embodiments, the zooming user interface application is configured to be edited by an authorized user during system runtime to thereby minimize downtime of the material handling system by allowing projects to be changed while they are running. For example, the zooming user interface module may be further programmed during runtime to modify portions of the representative diagram of the material handling system, to add or remove features, and/or to display additional data from the material handling control system. A material handling system with multiple HMIs in communication over a communication network thereby includes multiple linked ZUI modules being executed on the different HMIs at the same time. A user is able to edit a ZUI module at a first HMI while other users simultaneously operate and monitor the material handling system from the other HMIs. When the edits to the ZUI module are completed at the first HMI, the linked ZUI modules at all other HMIs are updated automatically during runtime without shutting down the material handling control system.

A zooming user interface is described herein with respect to a material handling system in a manufacturing facility or a distribution center, for example. However, the zooming user interface may be used with any type of material handling control systems including, for example, other automation operations.

Referring initially to FIG. 1, an exemplary control system 10 is illustrated according to some embodiments including an HMI computer station 16 that executes a zooming user interface (ZUI) module 28. Control system 10 is illustratively a distributed control system 10 for a material handling application in a manufacturing facility or a distribution center, for example. Control system 10 includes an electronic controller 12, illustratively a programmable logic controller (PLC), located in a control box or panel that communicates with several control modules 14A-14D distributed in zones throughout the facility. A zone includes a portion or section of the material handling system. For example, each zone may include one or more of the conveyor sections 162 of FIG. 9 described herein. Control modules 14A-14D illustratively correspond to control modules 172 described with the zooming user interface of FIGS. 3-39.

Although for illustrative purposes a single HMI 16 and a single PLC 12 are shown in FIG. 1, control system 10 may include any suitable number of PLCs 12 and HMI computer stations 16 depending on the size and configuration of the material handling system. Each HMI computer station 16 includes a zooming user interface module 28. In one embodiment, each HMI 16 is in communication with each PLC 12 of the control system 10. In another embodiment, each HMI 16 is in communication with a main PLC 12 while the remaining PLCs 12 are in communication with the main PLC 12. Accordingly, each HMI 16 is operative to receive data provided by each PLC 12 and to provide controls for each PLC 12 based on user input.

Each control module 14 of control system 10 includes control components and at least one electronic controller for controlling and monitoring one or more output devices 20 of the material handling system. Output devices 20A, 20B, 20C, 20D illustratively include electric motors (e.g., roller motors 176 of FIGS. 10 and 12) and I/O devices. The motors are used to drive conveyors, pumps, blowers, grinders, extruders, or other suitable devices of the material handling system. Exemplary I/O devices include scanners (e.g., scanners 170 of FIGS. 10 and 11), photoeyes, other sensors, pushbuttons, air-valves, actuators, audible devices (e.g., horns), visual devices (e.g., beacons), and other suitable I/O devices. Other suitable output devices 20 may include pumps, generators, other actuators, etc. PLC 12 provides control signals to control modules 14A-14D for controlling output devices 20A-20D. Each control module 14 communicates feedback and other signals to PLC 12, such as signals based on the I/O devices and motors of each respective zone. Additional PLCs 12 and control modules 14 may be provided. Power is distributed from a power distribution panel of the building or facility to the control modules 14A-14D, to PLC 12, and to HMI computer 16.

HMI computer 16 of FIG. 1 includes a monitor or display 22, at least one processor 24, and memory 26 accessible by the processor(s) 24. One or more user input devices 18 coupled to HMI computer 16 include a keyboard, mouse, touchscreen, and/or other suitable devices for providing user input to HMI computer 16. The user input is configured to navigate the zooming user interface and to provide control input for controlling one or more components of the material handling control system. For example, the user input selects or identifies an area of the display window to zoom into and/or to navigate to. A zooming user interface (ZUI) module 28 is executed by processor 24 to provide the zooming user interfaces of FIGS. 3-39 described herein. ZUI module 28 includes software and/or firmware (e.g., from memory 26) executing on processor 24.

The windows, tables, selectable inputs, fields, boxes, tabs, and other graphical icons of the zooming user interface which are referenced herein include data generated by HMI computer 16 and displayed on display 16 of FIG. 1.

Figure 2:
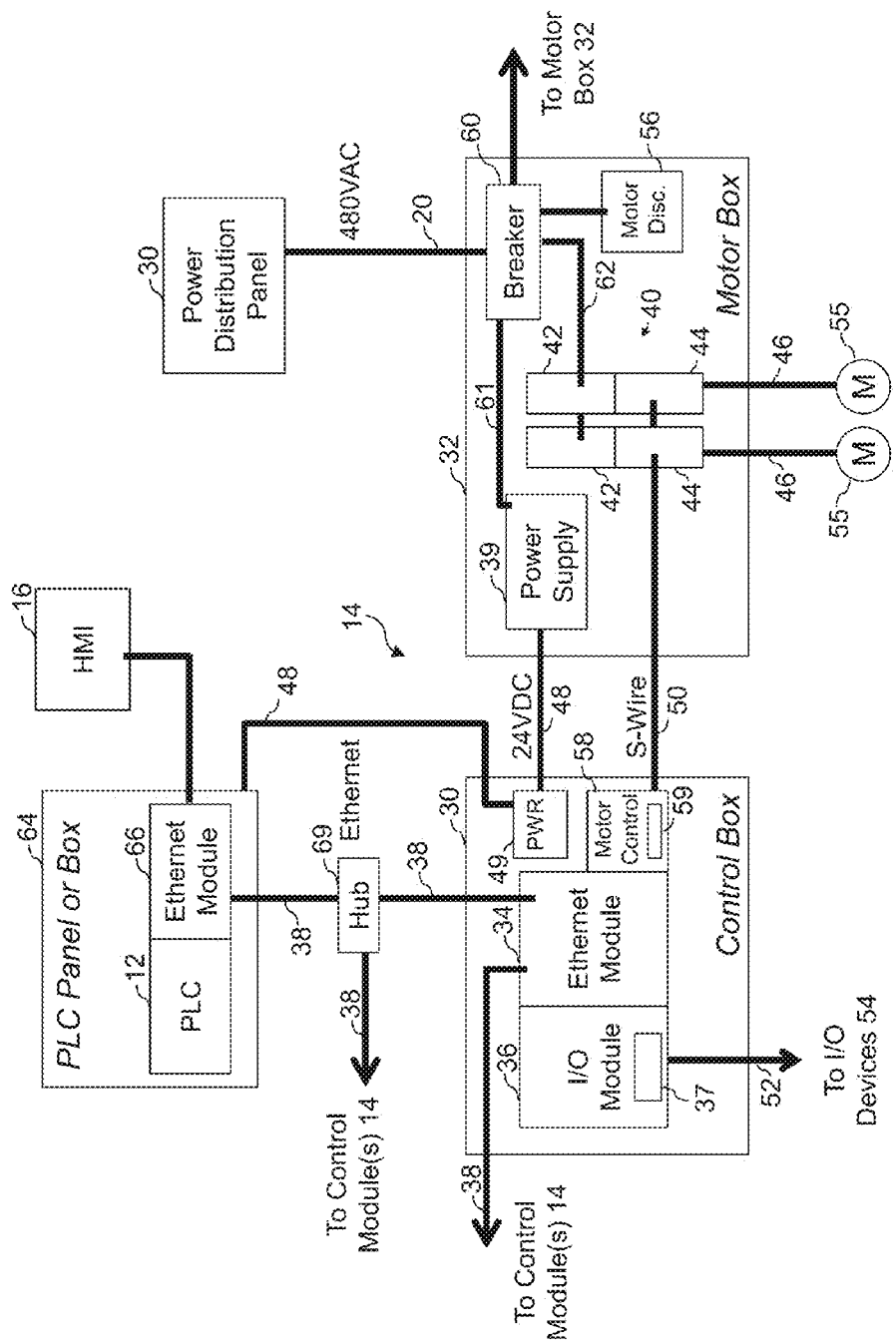
FIG. 2 is a block diagram of an exemplary control module of FIG. 1 in communication with the programmable logic controller and HMI of FIG. 1.

Referring to FIG. 2, an exemplary control module 14 of FIG. 1 is illustrated according to some embodiments. Control module 14 illustratively includes a control box 30 and a motor drive box 32. Control box 30 illustratively houses a communication module 34 and an input/output (I/O) module 36 in communication with the communication module 34. Communication module 34, illustratively an Ethernet communication module, transmits and receives control/feedback signals via communication cable 38 between PLC 12 and I/O module 34. I/O module 36 includes a plurality of I/O or control terminals 37 for connecting to I/O devices 54 of control system 10, such as sensors, transducers, actuators, lights, audio devices, and other suitable I/O devices provided in the local zone. A multi-wire communication cable 52 provides communication between I/O module 36 and output devices 54. I/O module 36 and communication module 34 cooperate to provide a communication interface between the I/O devices 54 and PLC 12. PLC 12 controls and receives feedback from I/O devices 54 in the respective zones 24 via I/O modules 36 of control boxes 30. PLC 12 communicates the I/O device feedback to HMI 16 for displaying as status data on the zooming user interface and receives controls from HMI 16 to control I/O devices 54 based on user input to the zooming user interface.

Control box 30 illustratively includes a motor control or communication module 58 for communicating control signals to and receiving motor feedback from motor box 32 via cable 50. In particular, motor control module 58 includes a plurality of I/O or control terminals 59 in communication with communication module 34 and with motor controller 40 via cable 50. In one embodiment, motor control module 58 converts Ethernet control signals received from module 34 into control signals suitable for transmission over cable 50 to motor controller 40. Communication module 34, motor control module 58, and cable 50 cooperate to provide a communication interface between the motor box 32 (i.e., motor controller 40) and PLC 12. As such, PLC 12 controls and receives feedback from motor boxes 32 in the respective zones 24 (FIG. 1) via motor control modules 58 of control boxes 30. PLC 12 communicates the motor feedback to HMI 16 for display on the zooming user interface and receives commands for the motors from HMI 16 based on user input to the zooming user interface.

As illustrated in FIG. 2, motor box 32 houses a motor controller 40, illustratively a motor starter assembly 40, including one or more motor starters 42 and corresponding motor I/O 44 that delivers power (e.g., three-phase 480 VAC) to motors 55. Power, illustratively 480 VAC, is routed to motor box 32 via a power cable 20 from power distribution panel 22 or from a nearby motor box 32. Power is routed to a circuit breaker 60 housed within motor box 32, and circuit breaker 60 routes the power to power supply 39 housed within motor box 32 via cable 61 and to motor starter assembly 40 via cable 62. Power supply 39 includes a regulator/rectifier that converts the high voltage, three-phase AC power to low voltage DC power (e.g. 24 VDC) that is routed to control box 30 via power cable 48 to provide a low voltage power source 49 at control box 30. Power source or supply 49, which receives power from power supply 39 of motor box 32, is used to power communication module 34, I/O module 36, motor control module 58, and other components of control box 30, as well as the I/O devices 54. In one embodiment, motor controller 40 includes one or more variable frequency drives 42 (VFDs) for controlling the speed and torque of AC motors 55. Other suitable AC or DC drives may be provided.

Cable 50 is routed between control box 30 and motor box 32 for communicating control and feedback signals between motor control module 58 of control box 30 and motor controller 40 of motor box 32. Each motor starter 42 of controller 40 drives a motor 55 based on the control signals provided with PLC 12 through module 34 and module 58 of control box 30. Power from motor box 32 is selectively routed from motor starters 42 to motors 55 via power cords or cables 46 to drive motors 55 based on control signals received via cable 50. In one embodiment, a control module 14 includes multiple motor boxes 32 provided in a single zone 24 (see FIG. 1) for controlling additional motors 55. Motor boxes 32 may alternatively include drivers and/or other controllers for controlling other suitable output devices, such as pumps, generators, other actuators, etc. A motor disconnect 56 is provided in motor box 32 and is configured to remove power to motor starters 42 and the respective motors 55 upon actuation or triggering.

PLC 12 is illustratively provided in a PLC box or panel 64 that also houses a communication module 66. Communication module 66, illustratively an Ethernet module 66, is operative to communicate control and feedback signals between control modules 14 and PLC 12 and between PLC 12 and HMI 16.

For further description of a distributed control system such as the control system 10 of FIGS. 1 and 2, see U.S. application Ser. No. 13/354,920, filed Jan. 20, 2012, issued as U.S. Pat. No. 8,659,189 on Feb. 25, 2014, entitled "CONTROL SYSTEM FOR A MATERIAL HANDLING APPLICATION," the entire disclosure of which is incorporated by reference herein.

An exemplary graphical user interface is illustrated in FIGS. 3-28 and described herein. The graphical user interface provides semantic zooming functionality in a display area or window provided on a monitor or display, such as on display 22 of HMI computer 16 (FIG. 1). The graphical user interface includes selectable data, such as selectable inputs, fields, modules, tabs, drop-down menus, boxes, and other suitable selectable data, that are linked to and provide input to the components of material handling control system 10. In one embodiment, the selectable data of the user interface is rendered in a manner that allows it to be individually selectable. For example, the selectable data is selected by a user with a mouse pointer, by touching a touchscreen of the user interface, by pressing keys of a keyboard, or by any other suitable selection mechanism (e.g., user input device 18 of FIG. 1). Selected data may result in the data being highlighted or checked, for example. The user interface further displays monitored data, including status and other feedback data, provided from one or more components of control system 10 (e.g., PLCs 12) that is displayed with the selectable data and the visualization of the control system 10. The display area is zoomable based on a zoom request provided with user input 18 that identifies an area of the display window for zooming, such as with a mouse pointer, by touching a touchscreen, by pressing keys of a keyboard, or by any other suitable user input 18. In some embodiments, a new screen, menu, or popup window appears in the display window based on selection of some selectable data (e.g., modules, drop-down menus, etc.).

Figure 3:
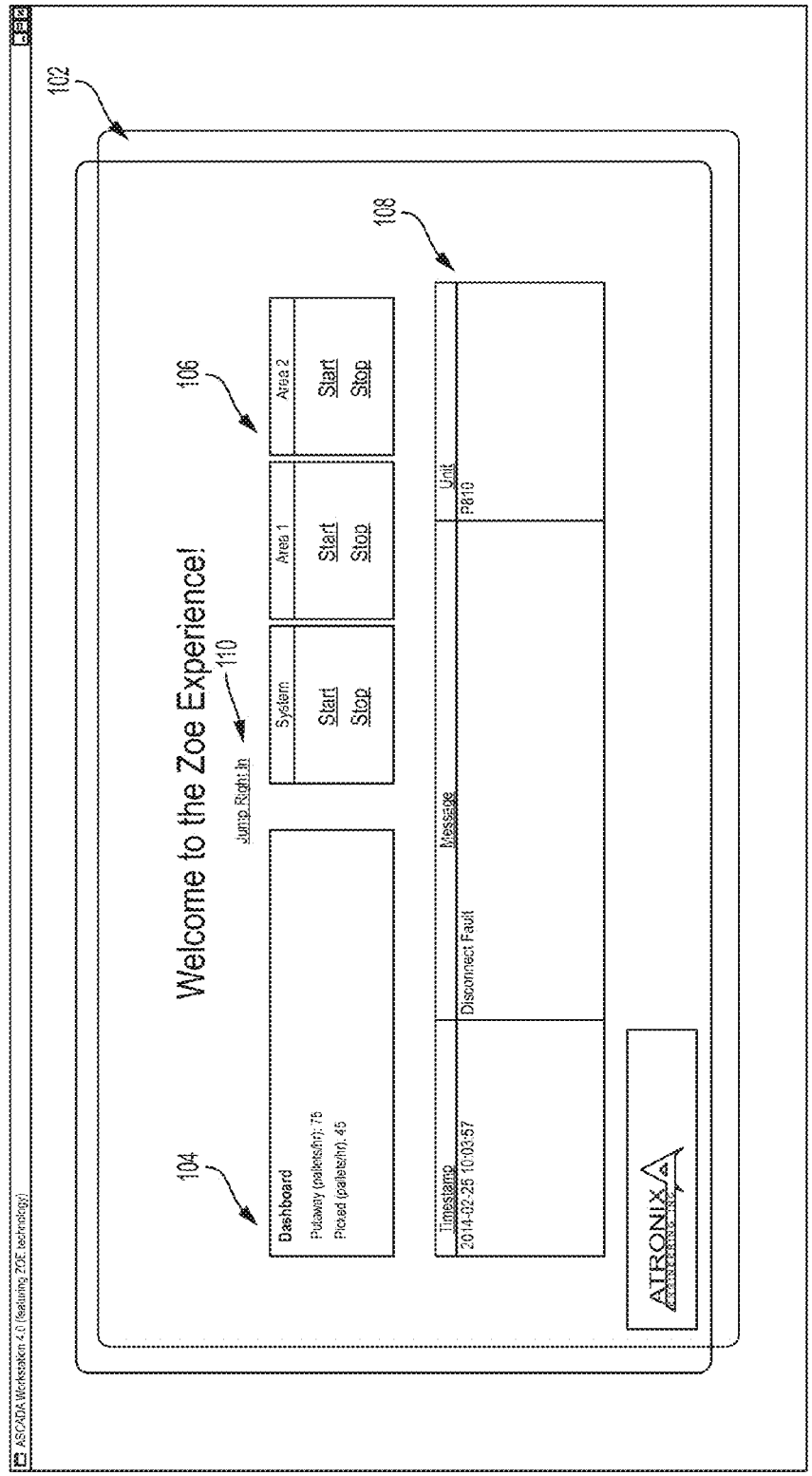
FIG. 3 illustrates a home screen of an exemplary user interface provided by a zooming user interface module of the HMI of FIG. 1.

Referring to FIG. 3, an exemplary home screen 102 is displayed by the zooming user interface module 28 of FIG. 1. Home screen 102 displays various information and data to an operator related to the material handling control system 10. Home screen 102 includes a dashboard window 104 displaying statistical data or metrics associated with the material handling system, illustratively the number of pallets per hour that are processed and completed. Windows 106 provide selectable start and stop inputs for the overall control system 10 and for areas or zones of the control system 10. For example, an operator may select the start/ stop inputs of windows 106 to start and stop operation of particular zones of the material handling system. Window 108 displays status and fault messages along with a corresponding timestamp and the affected location or unit. Selection of input 110 accesses the zooming user interface of FIGS. 4-28.

Figure 4:
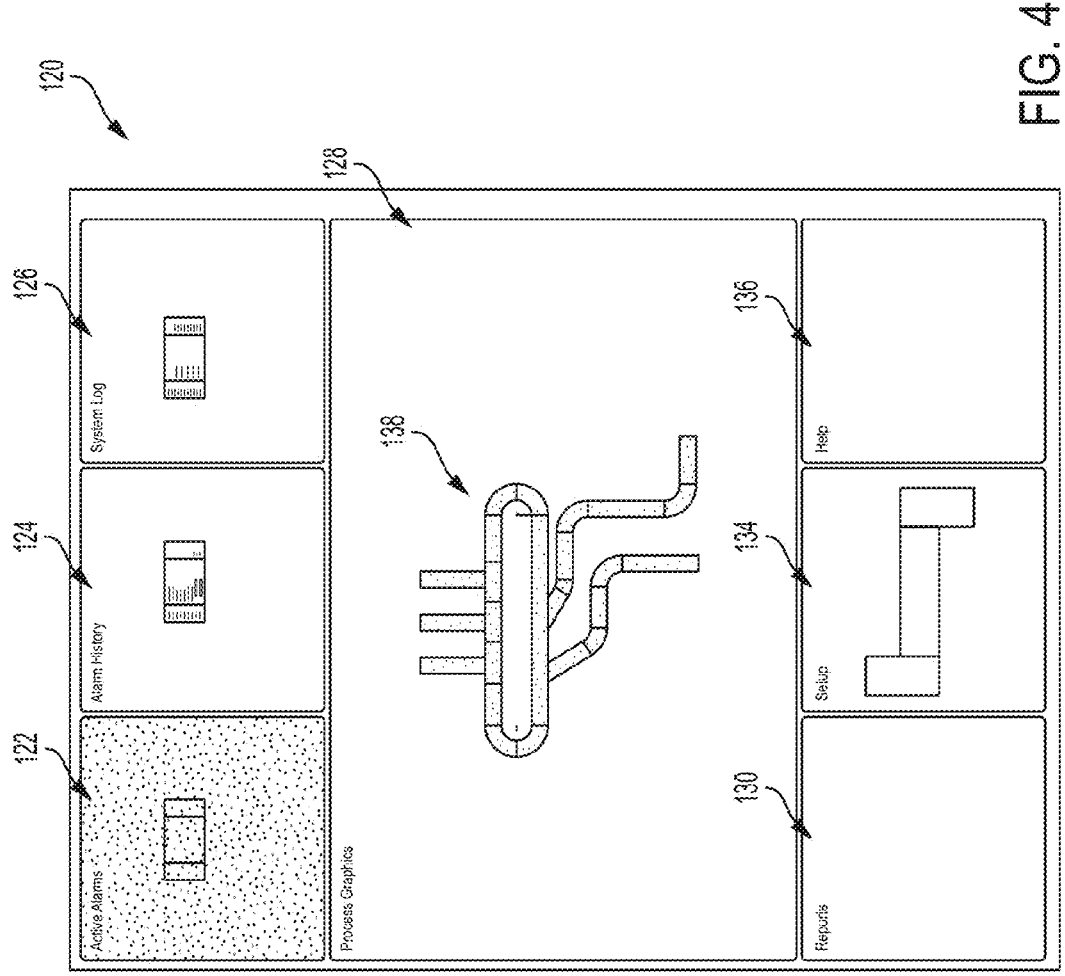
FIG. 4 illustrates a zooming user interface provided by the zooming user interface module of the HMI of FIG. 1, wherein the zooming user interface is fully zoomed out to display in a display area of a display an active alarms portion, an alarm history portion, a system log portion, a process graphics portion, a reports portion, a setup portion, and a help portion.

Referring to FIG. 4, a zoomable display area or window 120 is displayed initially following selection of input 110 of FIG. 3. Window 120 is fully zoomed out in FIG. 4 such that the entire zooming user interface is displayed including the display of a visualization or representative diagram 138 of the entire material handling system. Display area 120 of FIG. 4 illustratively includes the display of an active alarms portion 122, an alarm history portion 124, a system log portion 126, a process graphics portion 128, a reports portion 130, a setup portion 134, and a help portion 136, each comprising graphical display data. Using an input device 18 (FIG. 1) such as a keyboard, a mouse, and/or a touchscreen, a user may pan across window 120 in two dimensions and zoom into any objects or areas of interest. By semantically zooming into and out of areas of interest, a user changes the scale of the viewed area in order to see additional detail or less detail. In other words, in response to zooming into a particular area of display window 120, ZUI module 28 of FIG. 1 causes additional content or graphical objects to appear in the zoomed portion. The additional content or objects include visualizations and status data of components of the material handling system, selectable control inputs, modifiable fields and tables, and/or other suitable objects.

Figure 5:
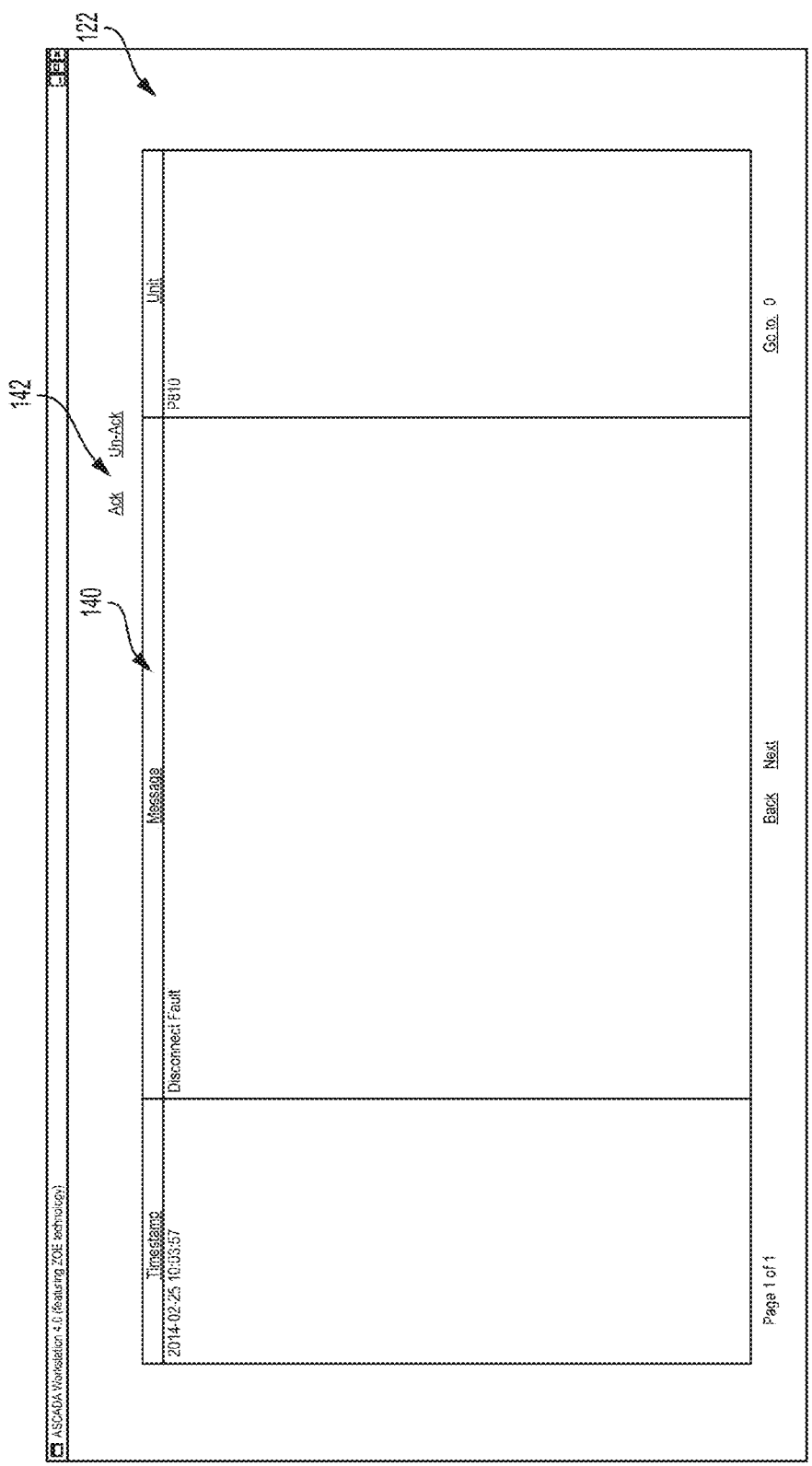
FIG. 5 illustrates the zooming user interface of FIG. 4 zoomed in to the active alarms portion.

Zooming into active alarms portion 122 of display window 120 of FIG. 4 causes the display of the active alarms window 140 of FIG. 5. Active alarms window 140 displays a list of current alarm messages as well as the corresponding timestamp of the alarm and the affected unit or area of the control system 10. A user may acknowledge or unacknowledge each selected alarm via inputs 142. Acknowledging an alarm may include clearing the alarm or changing the alarm message status to indicate it has been seen by the user.

Zooming into alarm history portion 124 of FIG. 4 causes the display of alarm history window 150 of FIG. 6. Alarm history window 150 displays a list of past alarm events as well as the corresponding timestamp of the alarm and the affected unit or component of the control system 10. Multiple pages of alarms may be cycled through with selectable inputs 152, and a specific page may be accessed quickly via selectable input 154.

Similarly, zooming into systems log portion 126, reports portion 130, and help portion 136 of FIG. 4 causes the display of a detailed systems log window, a detailed reports window, and a detailed help window, respectively. The help window may provide look-up documents including instructions for operating and/or troubleshooting the ZUI module 28.

Figure 7:
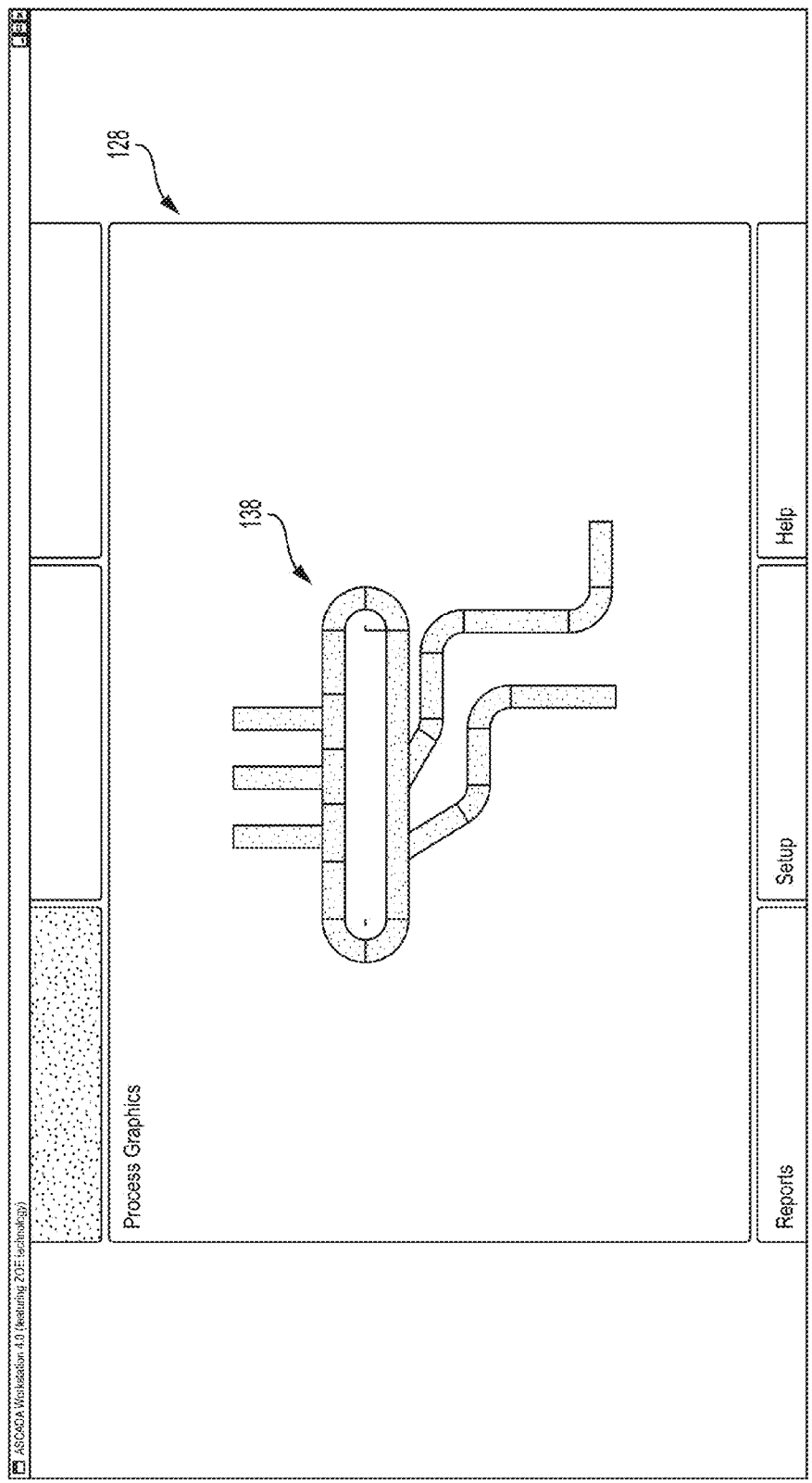
FIG. 7 illustrates the zooming user interface of FIG. 4 zoomed in to the process graphics portion, wherein the process graphics portion includes a graphical representation of the material handling system.
Figure 8:
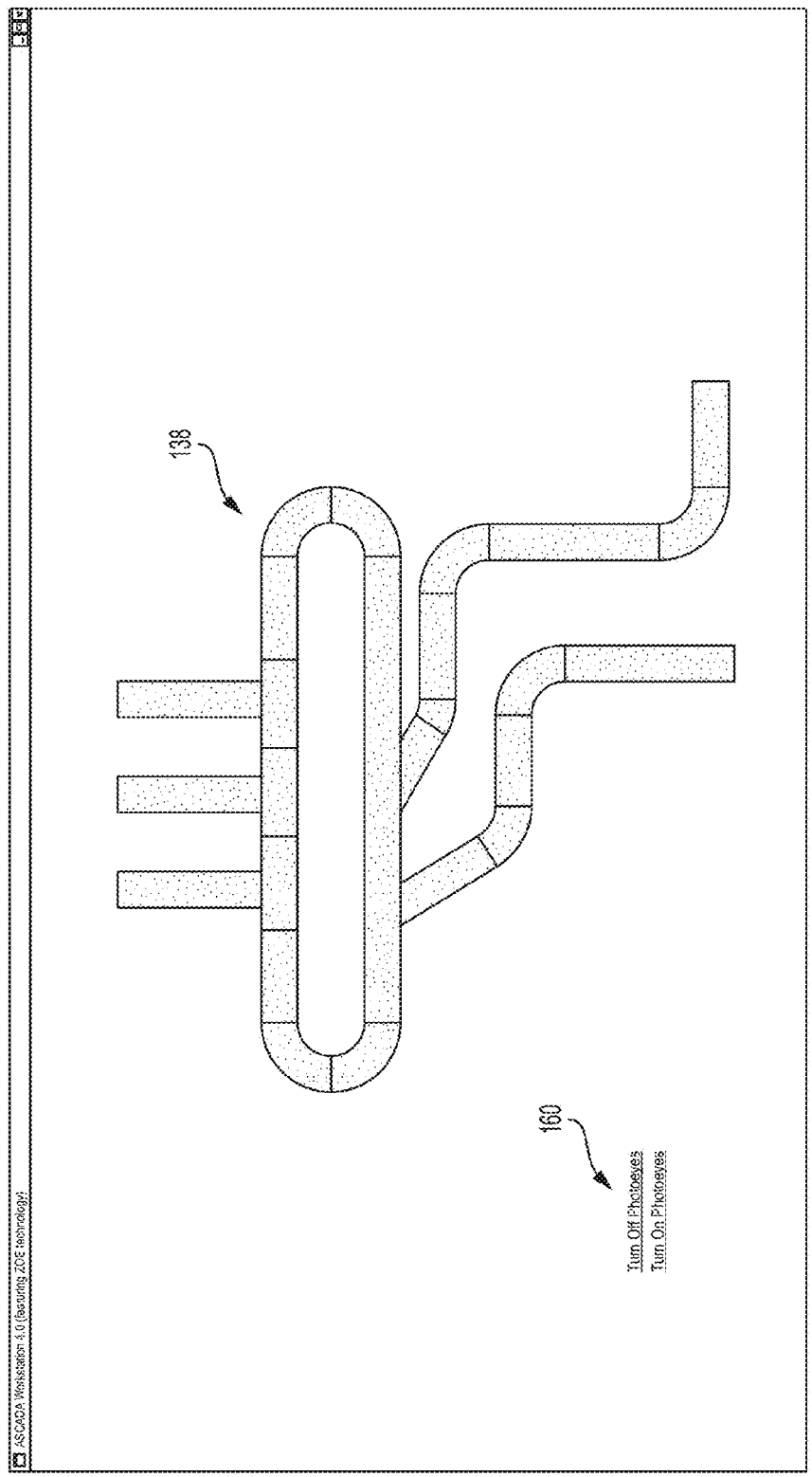
FIG. 8 illustrates the process graphics portion of FIG. 7 further zoomed in to display additional content.
Figure 9:
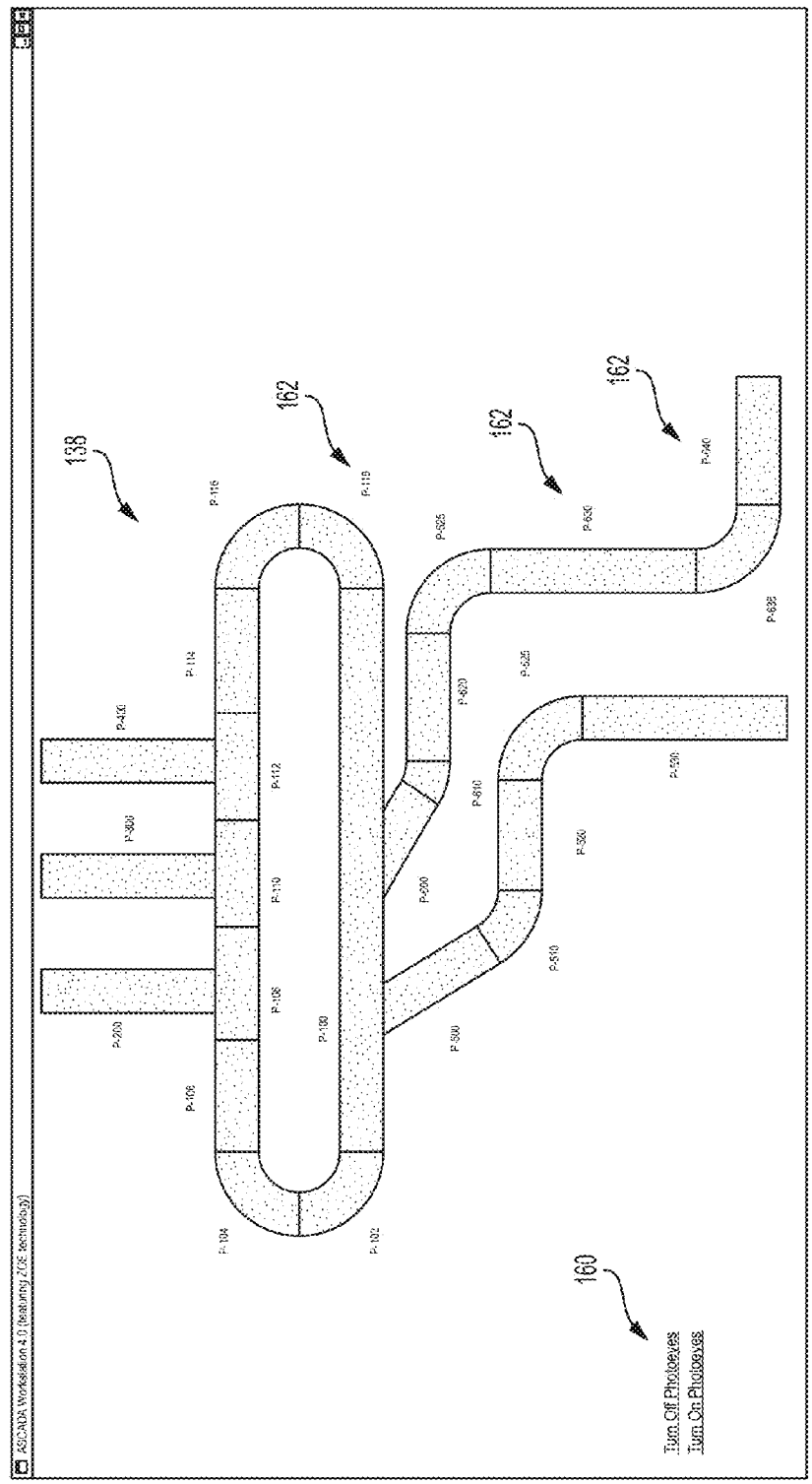
FIG. 9 illustrates the process graphics portion of FIG. 8 further zoomed in to display additional content.

Process graphics portion 128 of FIG. 4 includes a schematic or representative diagram 138 of the physical layout of the material handling system, illustratively from a top-down or birds-eye perspective. In the illustrated embodiment, the visualizations of each component of the material handling system are arranged in diagram 138 according to the physical arrangement of the components in the physical material handling system of the facility. As a user zooms into process graphics portion 128, additional detail of the components of the material handling system and associated controls and information is displayed in the display window 120. For example, FIG. 7 illustrates process graphics portion 128 after an initial amount of zooming, and FIG. 8 illustrates process graphics portion 128 after further zooming, and FIG. 9 illustrates process graphics portion 128 after still further zooming. The different sections of the conveyors are illustrated in diagram 138 of FIGS. 7-9. In the zoom level of FIG. 8, selectable inputs 160 are displayed for turning on and off photoeyes (or other suitable sensor/control devices) of the material handling system. In another embodiment, the inputs 160 of FIG. 8 allow a user to simulate turning on and off photoeyes or other sensors/control devices. In the zoom level of FIG. 9, the label or name 162 of each conveyor section is displayed. Labels 162 and other labels in diagram 138 (e.g., labels for control modules 172, scanners 170, motors 176, etc.) may correspond to the names of each component provided in the schematic drawings and programming code of controllers of the material handling system.

Figure 10:
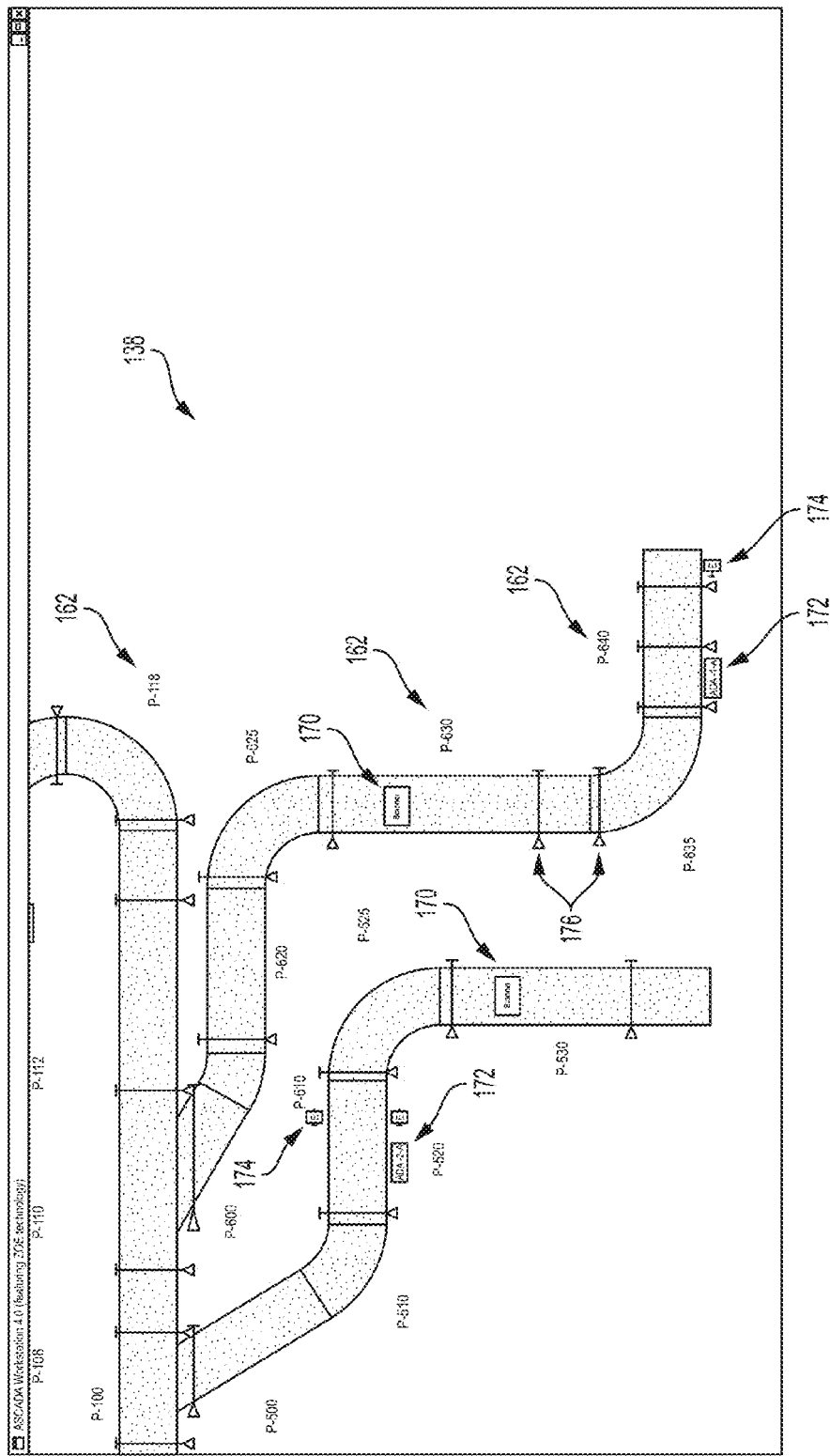
FIG. 10 illustrates the process graphics portion of FIG. 9 further zoomed in to display additional content.

In FIG. 10, the bottom right portion of diagram 138 of FIG. 9 is further zoomed to display representations of additional components of the material handling system, including control modules 172, emergency stops (E-stops) 174, scanner modules 170, roller motors 176, and other suitable control system components. As such, additional objects representing the component layout of the material handling system are displayed via semantic zooming of diagram 138.

Figure 11:
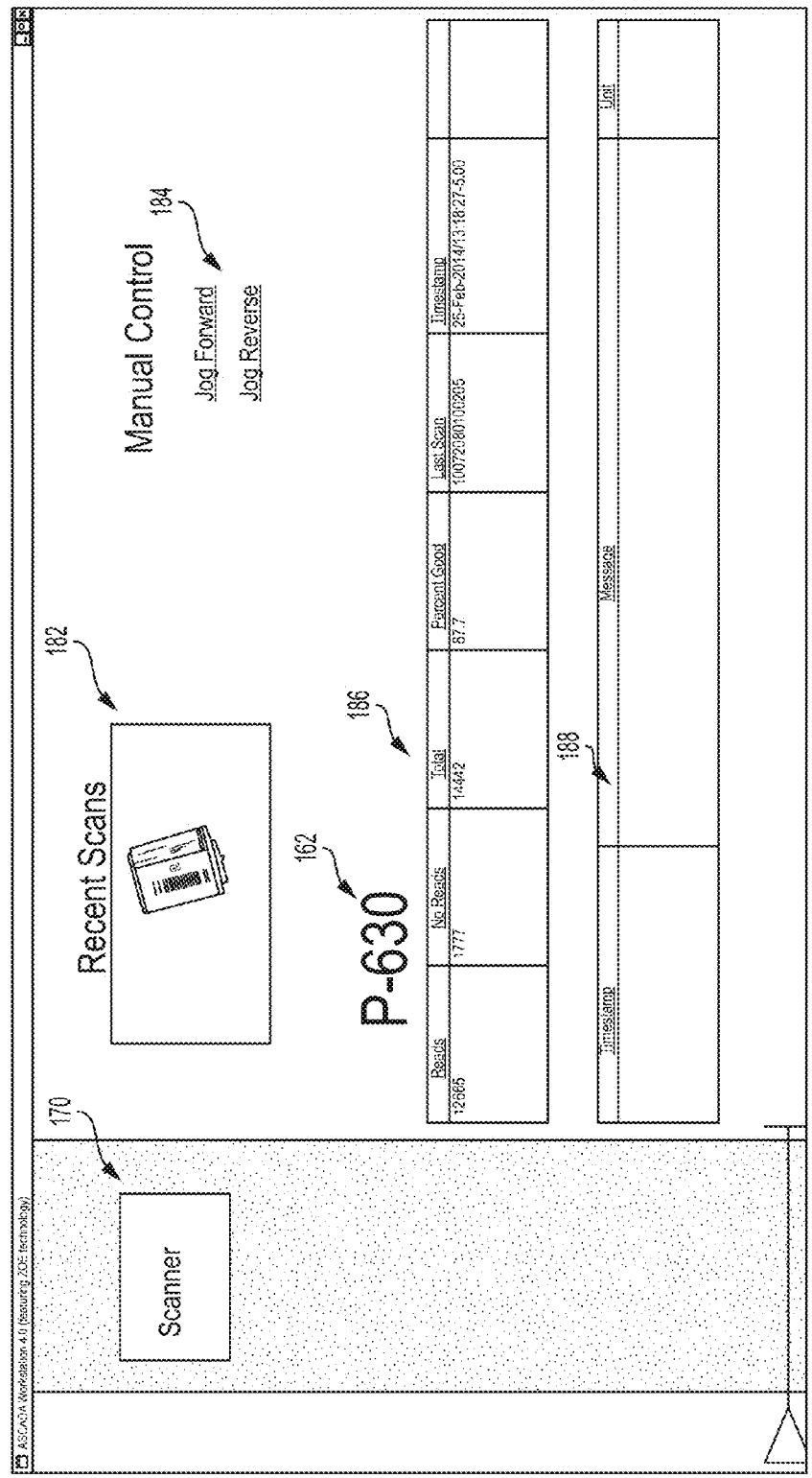
FIG. 11 illustrates the process graphics portion of FIG. 10 further zoomed in to display additional content including data associated with a scanner of the material handling system.

Upon zooming into scanner module 170 of conveyor section P-630 of FIG. 10, detailed status information and selectable control inputs related to the conveyor section P-630 are displayed, as illustrated in FIG. 11. In particular, selectable inputs 184 provide manual controls to allow a user to jog the conveyor section forward or backwards. A table 186 provides a list of most recent items scanned by scanner 170 of conveyor section P-630. A photo or video of scanned items is displayed in a recent scans window 182. Table 186 displays the number of scanned items ("Reads"), items that could not be scanned ("No Reads"), the total number of items passing through conveyor section P-630 ("Total"), the percentage of successful scans ("Percent Good"), the most recent item scanned ("Last Scan"), and the timestamp of the most recent number scanned. Table 188 displays relevant status or alarm messages associated with scanner 170 and conveyor section P-630. Accordingly, the zooming user interface breaks out alarms and statuses associated with each component of the material handling system automatically as the user zooms in towards the corresponding component. Other suitable information may be displayed in tables 186 and 188, and different types of information may be displayed for different components of the material handling system of the corresponding conveyor section.

Figure 12:
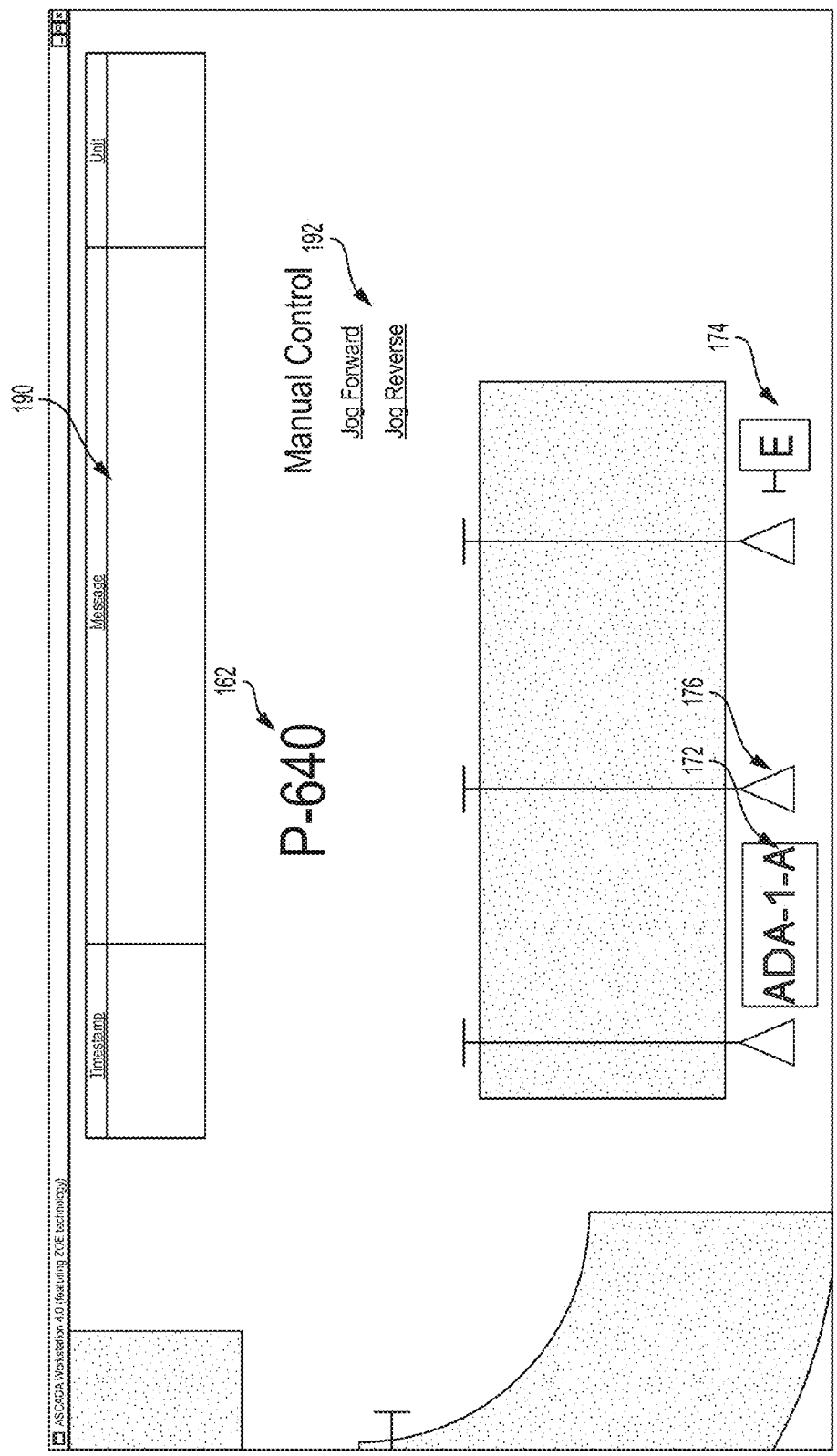
FIG. 12 illustrates the process graphics portion of FIG. 10 further zoomed in to display additional content including data associated with a conveyor section of the material handling system.

Upon zooming into conveyor section P-640 of FIG. 10, detailed information and selectable controls related to the conveyor section P-640 are displayed in the display window, as illustrated in FIG. 12. Conveyor section P-640 illustratively includes a control module represented with icon 172 labeled ADA-1-A, several motorized rollers represented with icons 176 controlled by control module ADA-1-A, and an E-stop represented with icon 174. Selectable inputs 192 provide manual controls to allow a user to jog the conveyor section P-640 forward or backwards. Table 190 displays relevant status or alarm messages associated with control module 172, rollers 176, E-stop 174, and conveyor section P-640.

Figure 13:
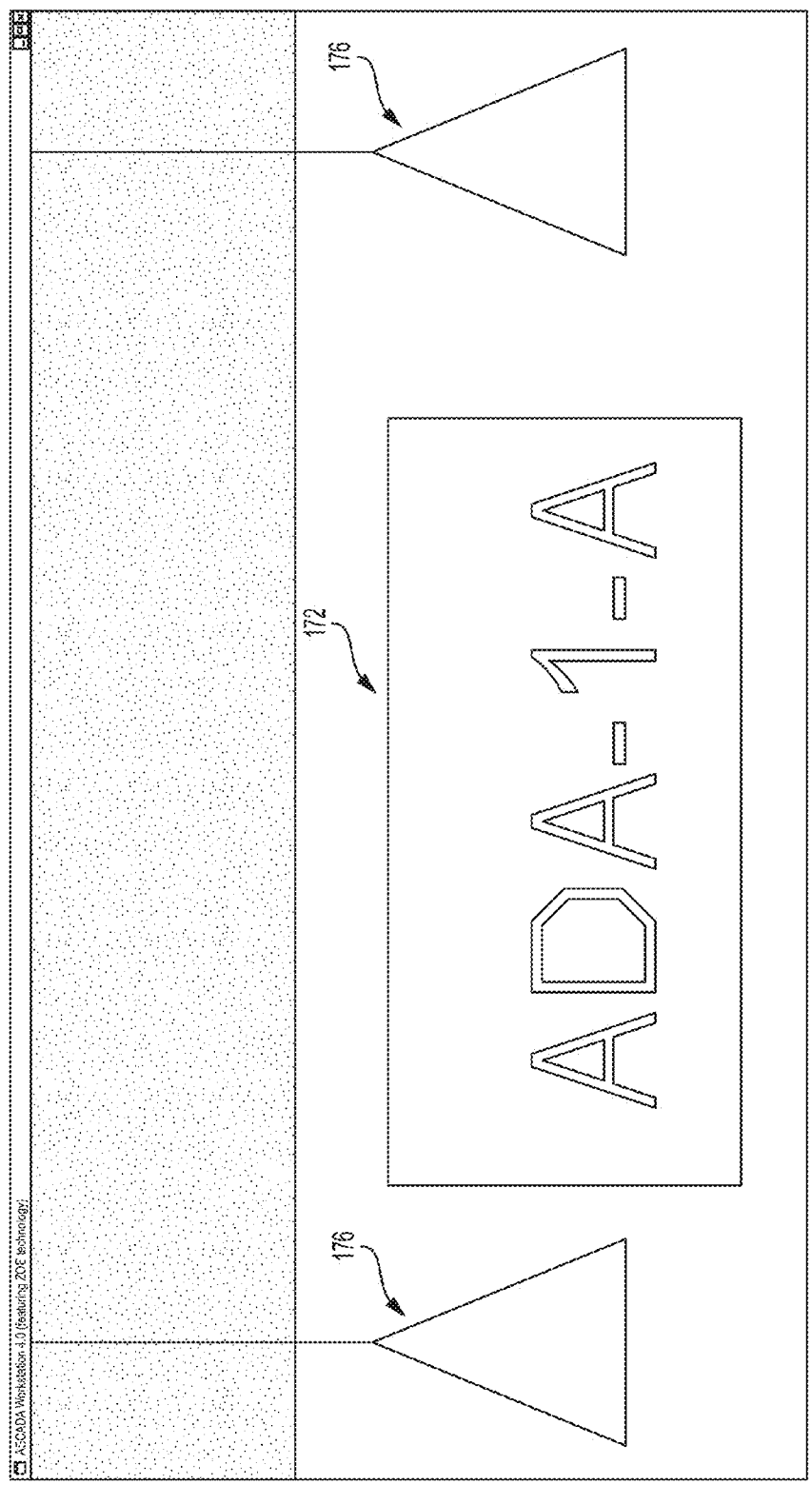
FIG. 13 illustrates the process graphics portion of FIG. 12 further zoomed in to display enlarged graphical objects representing a conveyor section, a control module, and motors of the material handling system.
Figure 14:
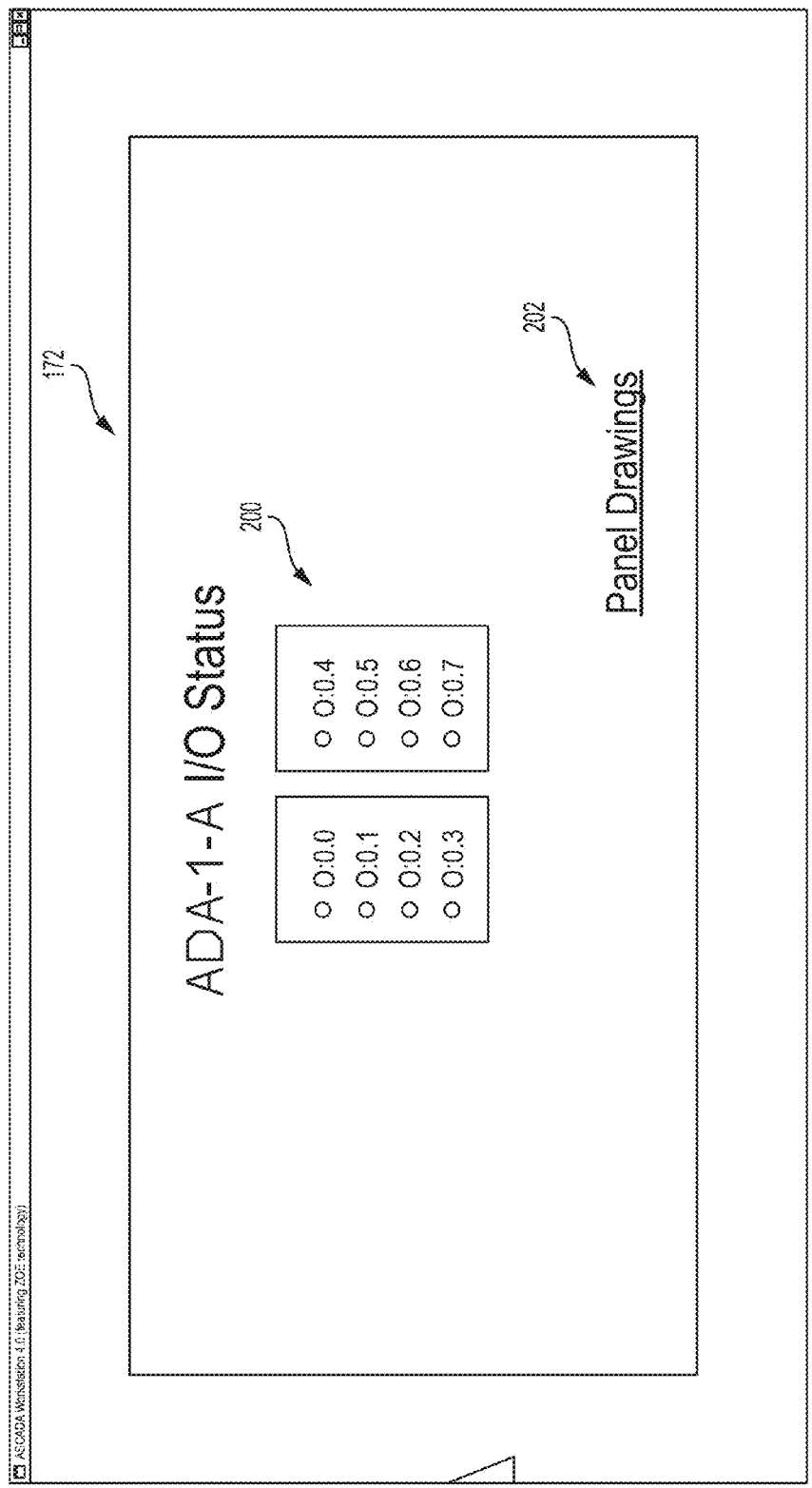
FIG. 14 illustrates the process graphics portion of FIG. 13 further zoomed in to display additional content including status data and a hyperlink associated with the control module of FIG. 13.

By further zooming into any of components 172, 174, 176 of FIG. 10, additional content including status information and controls are displayed. For example, FIG. 13 illustrates icon 172 of the control module ADA-1-A and motorized rollers 176 further zoomed, and FIG. 14 illustrates icon 172 of control module ADA-1-A zoomed even further. In FIG. 14, detailed status of the input/outputs (I/O) and other components of control module ADA-1-A is illustrated in schematic 200. In particular, schematic 200 displays the name (label) and the status of inputs and outputs (see motors and I/O of FIG. 2, for example) controlled by control module ADA-1-A. In addition, a selectable input or hyperlink 202 is displayed that allows a user to access documentation related to control module ADA-1-A, illustratively panel drawings associated with control module ADA-1-A. Other suitable information related to control module ADA-1-A such as alarms, for example, may be displayed at this zoom level.

Figure 15:
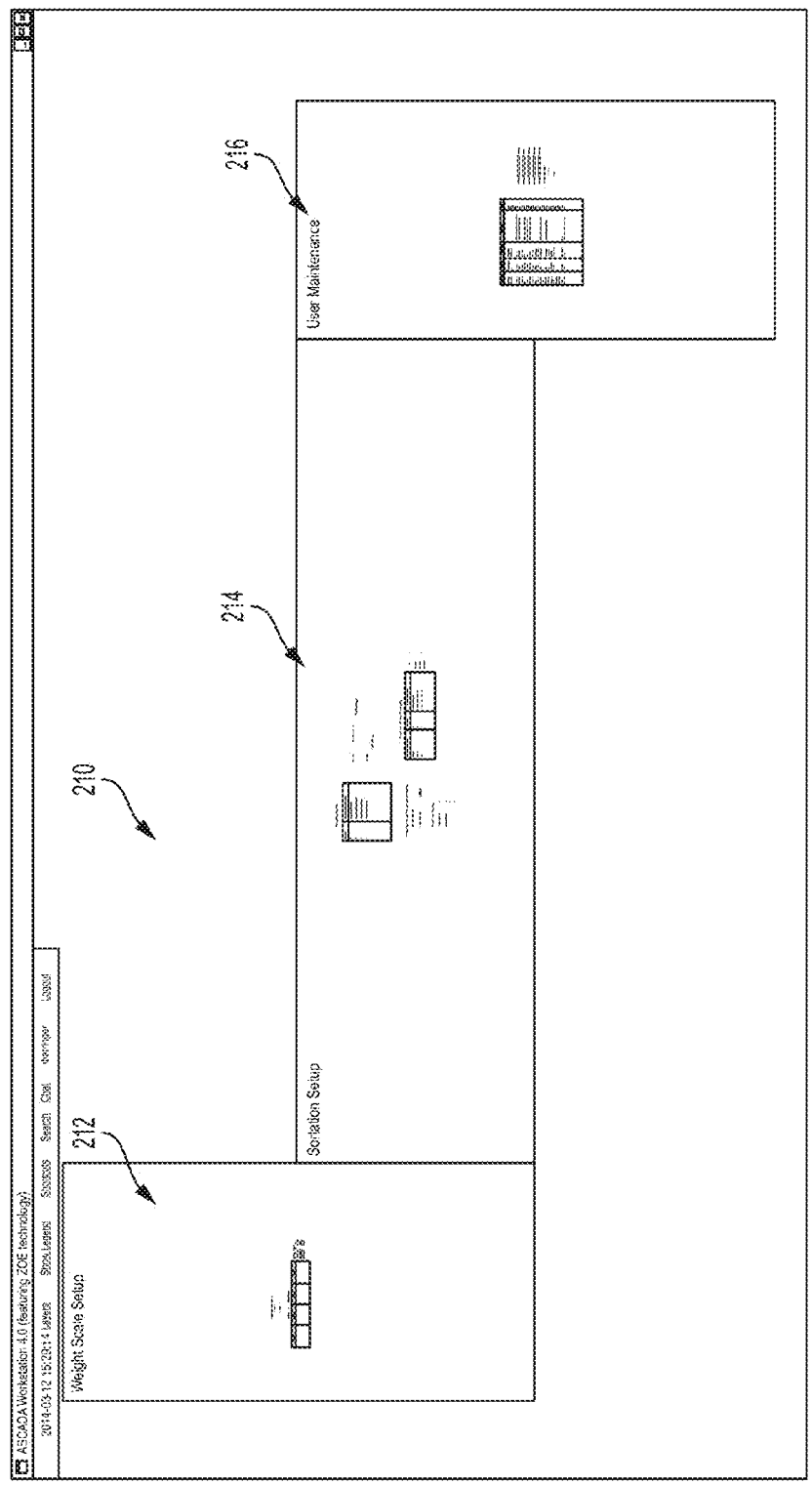
FIG. 15 illustrates the zooming user interface of FIG. 4 zoomed in to the setup portion including a weight scale setup portion, a sortation portion, and a user maintenance portion.
Figure 16:
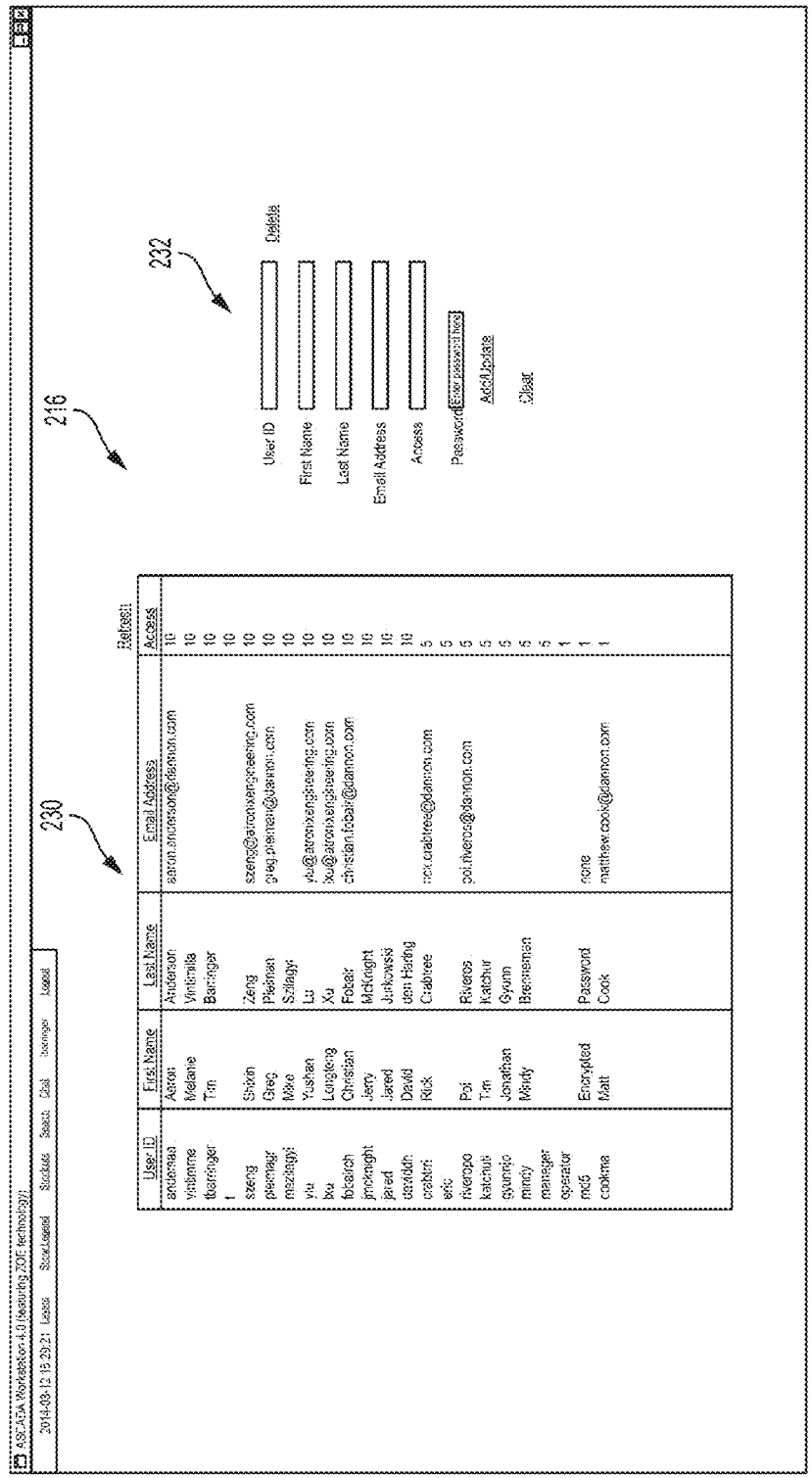
FIG. 16 illustrates the setup portion of FIG. 15 further zoomed in to display additional content for the user maintenance portion.
Figure 17:
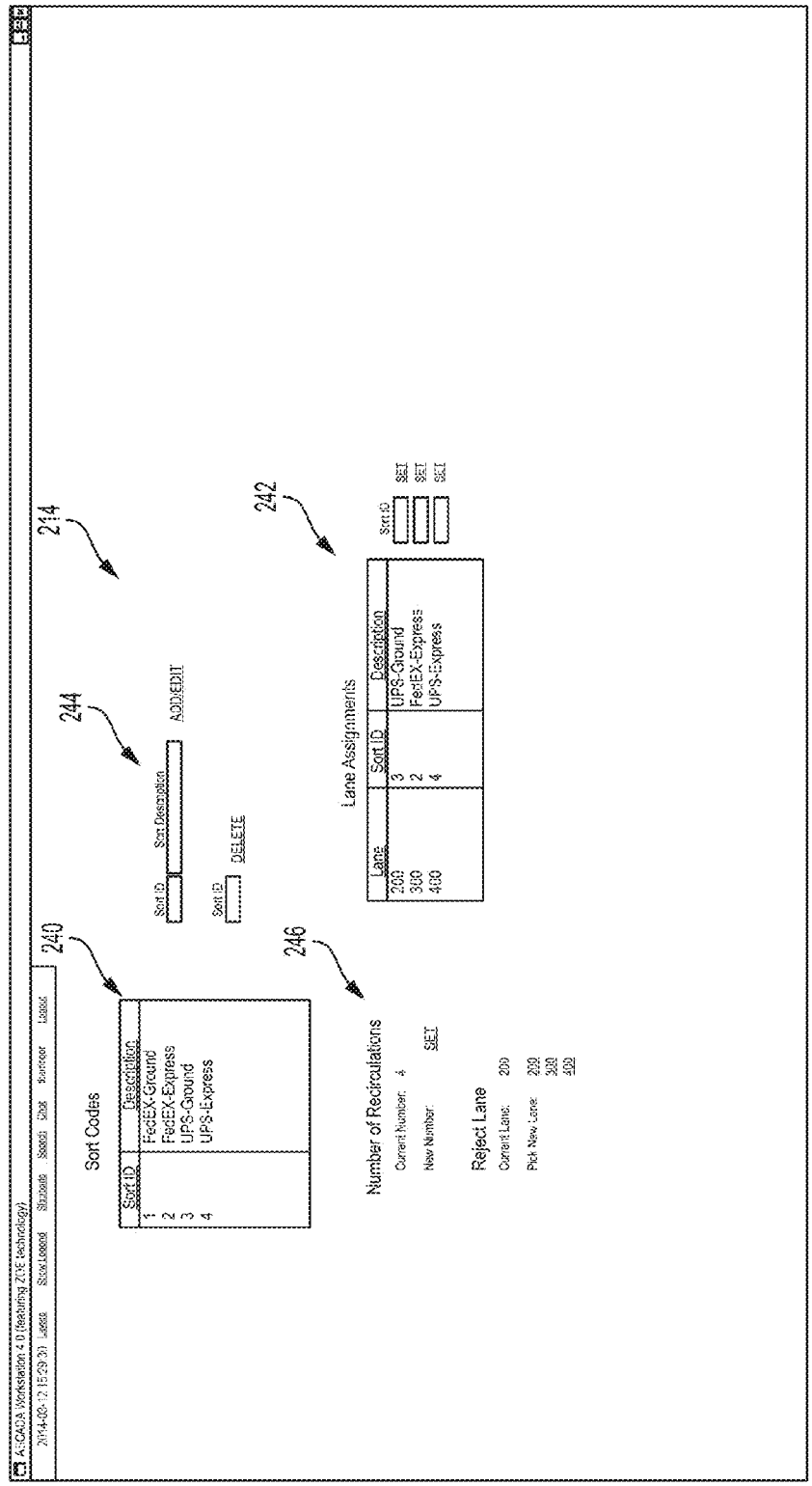
FIG. 17 illustrates the setup portion of FIG. 15 further zoomed in to display additional content for the sortation portion.
Figure 18:
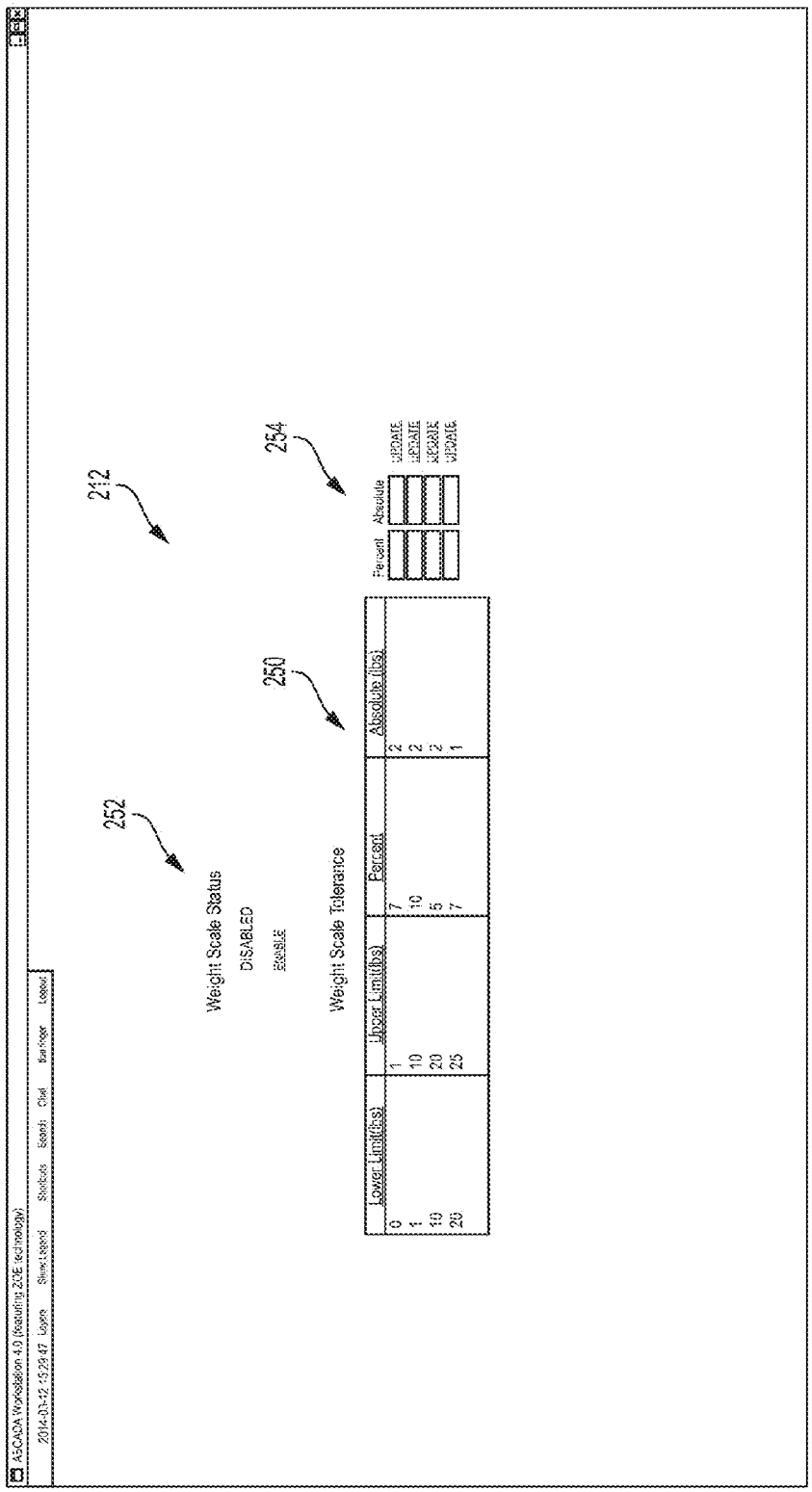
FIG. 18 illustrates the setup portion of FIG. 15 further zoomed in to display additional content for the weight scale setup portion.

Referring again to FIG. 4, zooming into setup portion 134 causes the display of system setup window 210 of FIG. 15 in the display window. Setup window 210 illustratively includes a weight scale setup portion 212, a sortation portion 214, and a user maintenance portion 216. Further zooming into portions 212, 214, 216 provides access to selectable options and information related to each of the respective general setup, custom setup, and user maintenance. For example, FIG. 16 illustrates a zoomed user maintenance portion 216 including a table 230 listing the names, user identifications (IDs), and email addresses of approved users of the zooming user interface system. New users may be given access or current users may be updated or deleted by entering user information via inputs 232. FIG. 17 illustrates a zoomed sortation portion 214 of FIG. 15 including a sort codes table 240 listing sort IDs for mail delivery providers, inputs 244 for adding or editing the sort IDs of table 240, a lane assignments table 242 listing the lanes assigned to the mail delivery providers, and inputs 246 for editing lane information. FIG. 18 illustrates a zoomed weight scale setup portion 212 of FIG. 15 including a weight scale tolerance table 250 listing weight tolerances and current loaded weights for different conveyor sections of the material handling system, inputs 254 for editing the weight information, and inputs 252 for enabling or disabling the weight scale status. Other information may be provided in the portions of FIGS. 16-18 depending on the type of material handling control system.

Figure 19:
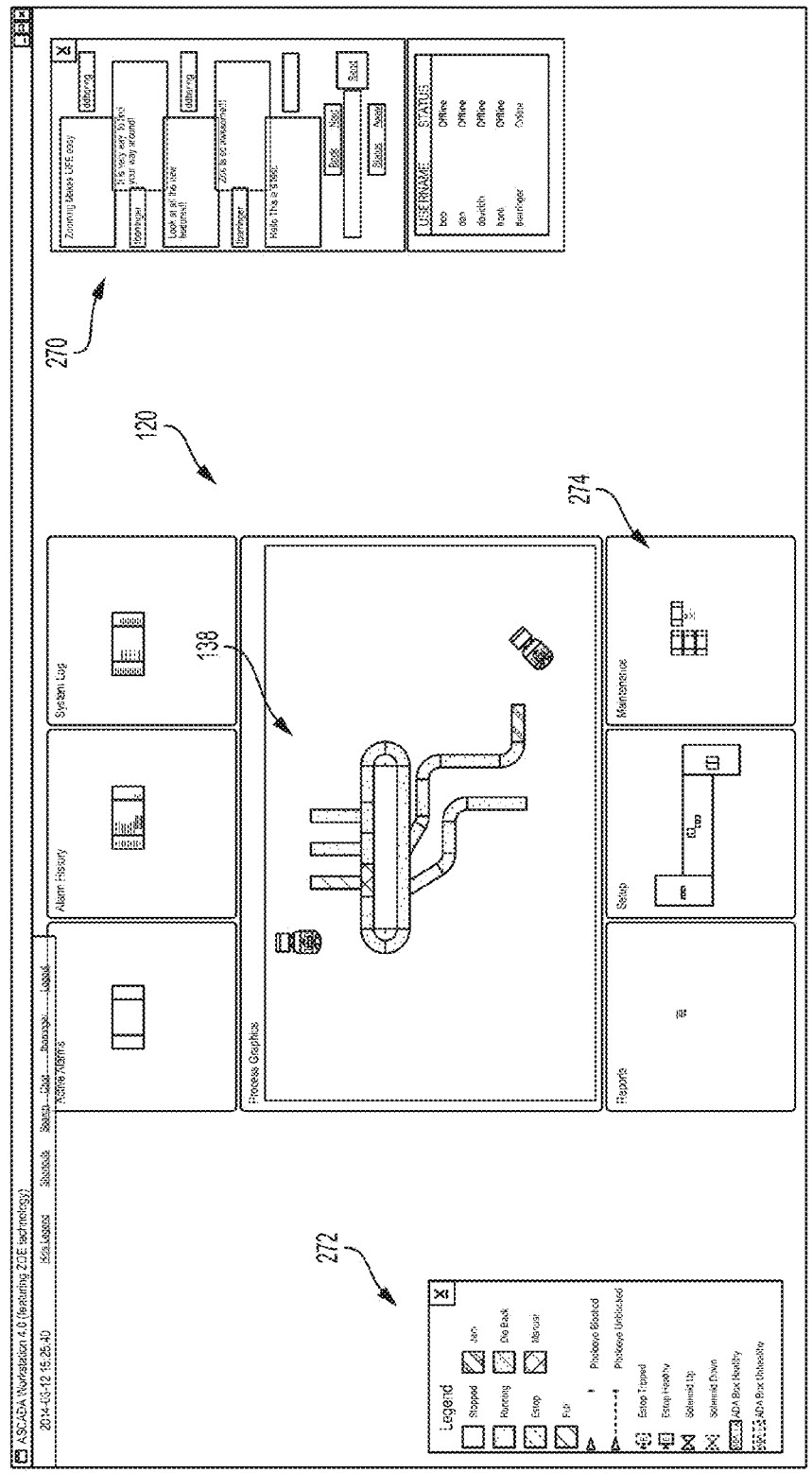
FIG. 19 illustrates the zooming user interface of FIG. 4 according to another embodiment including a messaging window and a status legend displayed in the display area.

FIGS. 19-28 illustrate another embodiment of the zooming user interface of FIGS. 3-18. As illustrated in FIG. 19, a popup window 270 is displayed that allows the user to communicate with other users that are logged into the ZUI system of the material handling control system 10 (FIG. 1) using an instant messaging program. Further, a legend 272 is displayed that is coded (e.g., color or pattern-coded) to correspond to coded sections of conveyor diagram 138. As illustrated in FIGS. 19 and 21-28, codes indicate whether the conveyor section is stopped, running, stopped to due E-stop, at full capacity, in manual mode, jammed, or die back. In addition, legend 272 provides other status indicators associated with diagram 138 including status indications for a photo-eye being blocked or unblocked, an E-stop being tripped or not tripped, a solenoid being up or down, and a control module being healthy or unhealthy. Other suitable indicators may be provided with legend 272 and diagram 138. In one embodiment, legend 272 may be closed by a user to remove from the display window.

Figure 20:
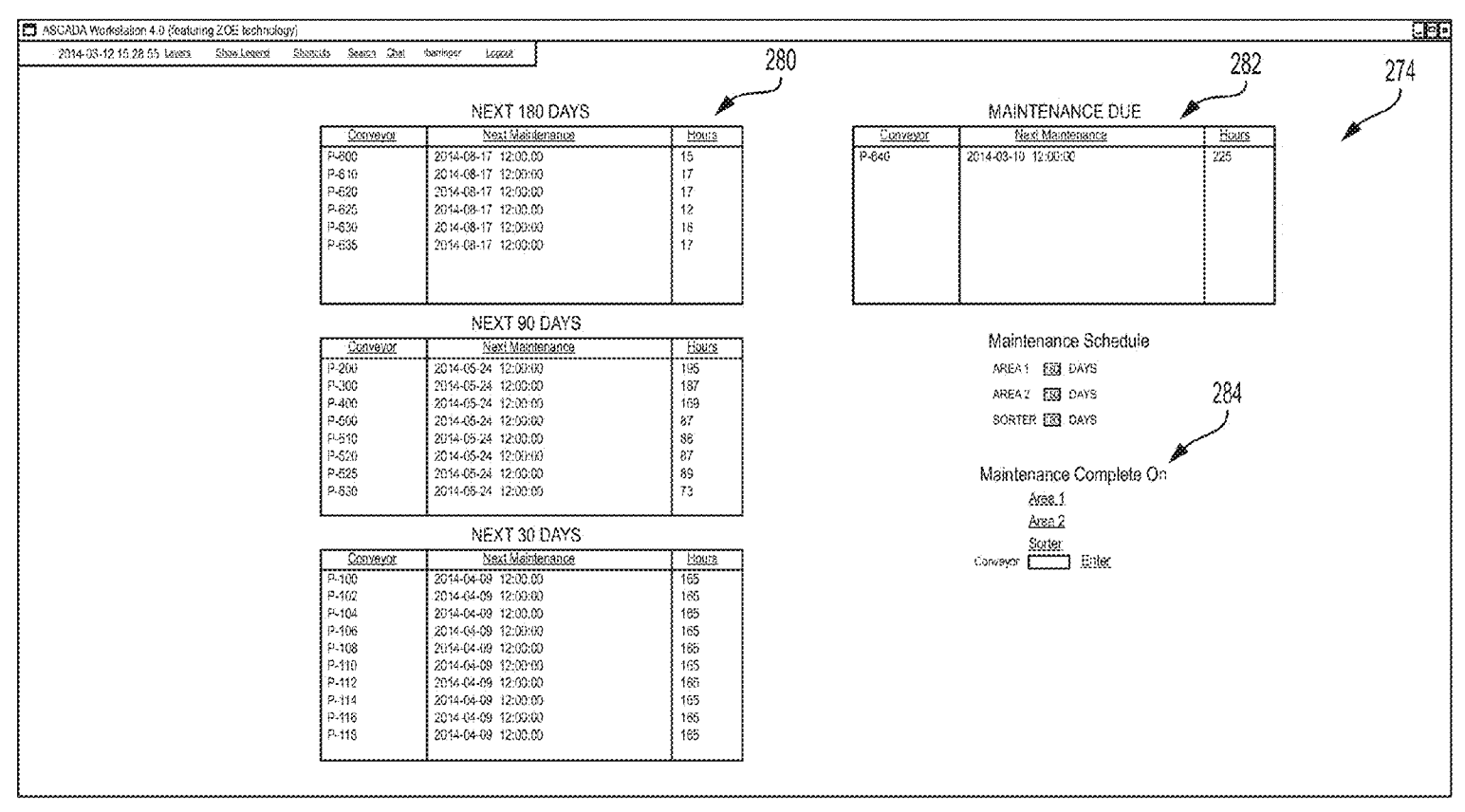

A maintenance portion 274 of FIG. 19 is illustratively zoomed in FIG. 20 to display a plurality of tables 280 providing system maintenance schedules for various time periods for the conveyor sections of the material handling system, including maintenance schedules for the next 180 days, 90 days, and 30 days. A table 282 lists maintenance items that are currently due or past due. Maintenance updates may be entered by the user via inputs 284.

Figure 21:
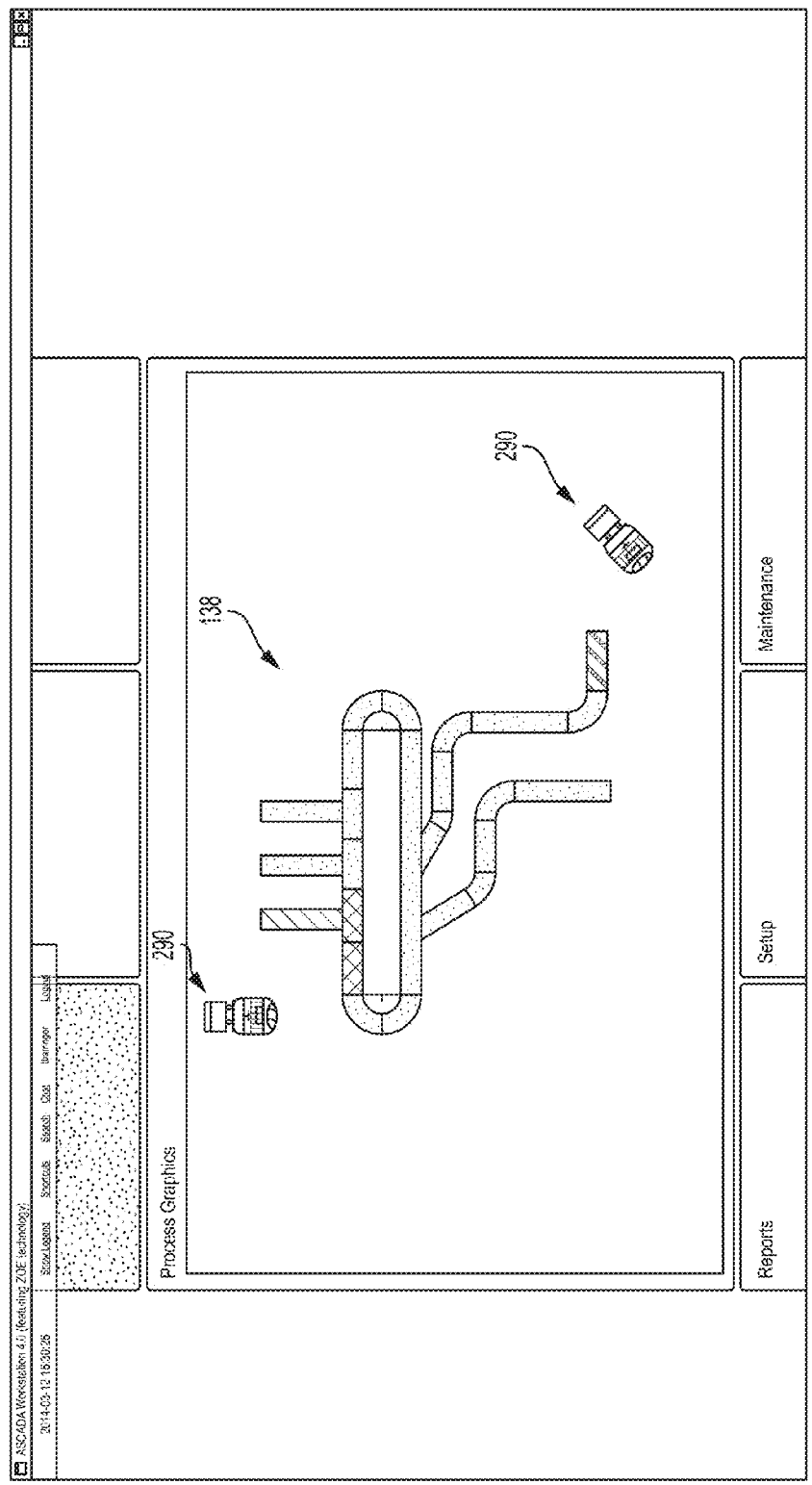
FIG. 21 illustrates the zooming user interface of FIG. 19 zoomed in to a process graphics portion, wherein the process graphics portion includes graphical representations of the material handling system and vehicles in the material handling facility.
Figure 22:
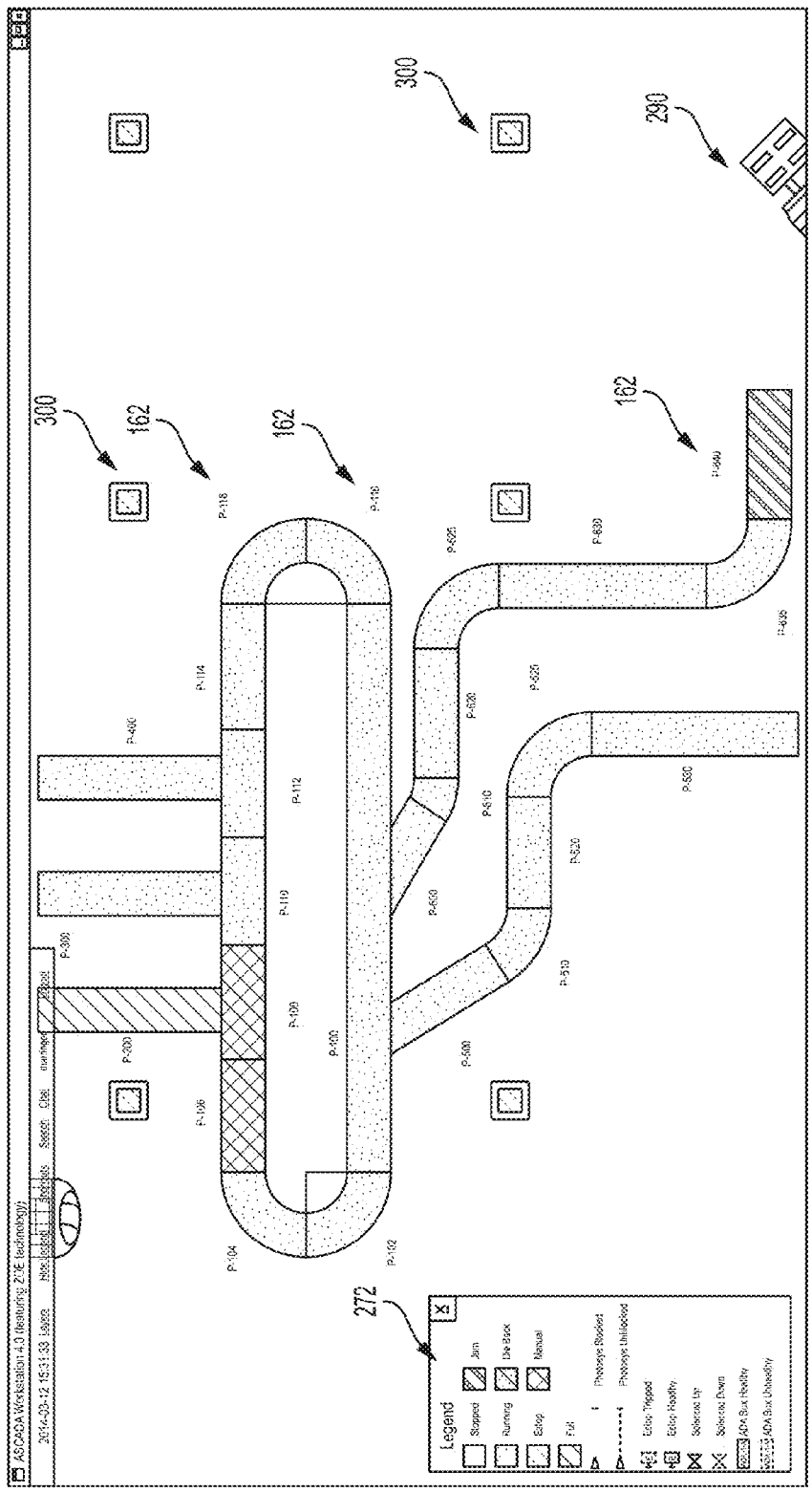
FIG. 22 illustrates the process graphics portion of FIG. 21 further zoomed in to display additional content including objects in the material handling facility and status data.
Figure 23:
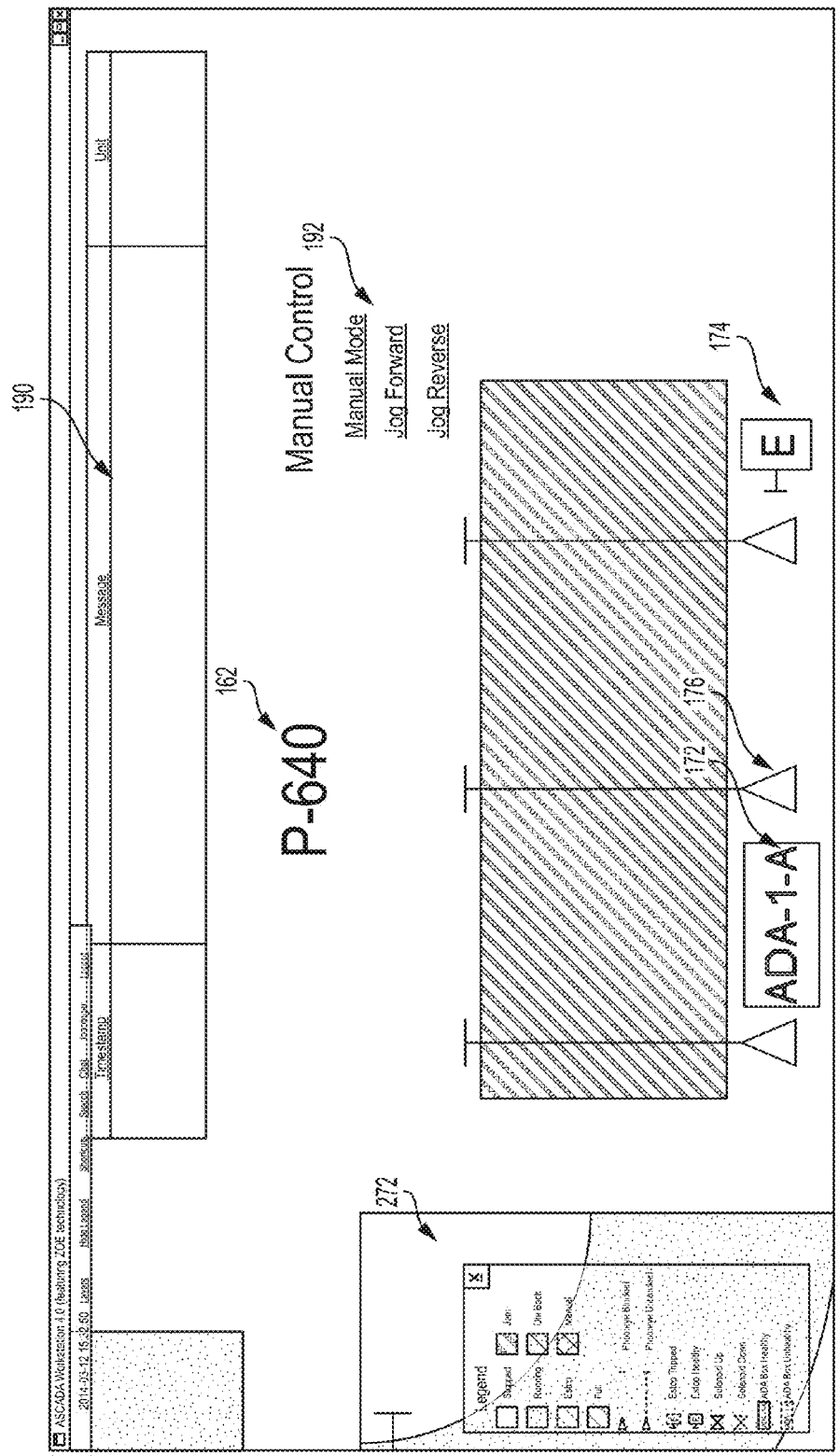
FIG. 23 illustrates the process graphics portion of FIG. 22 further zoomed in to a conveyor section of the material handling system to display graphical objects representing a control module, roller motors, control inputs, and status data.
Figure 24:
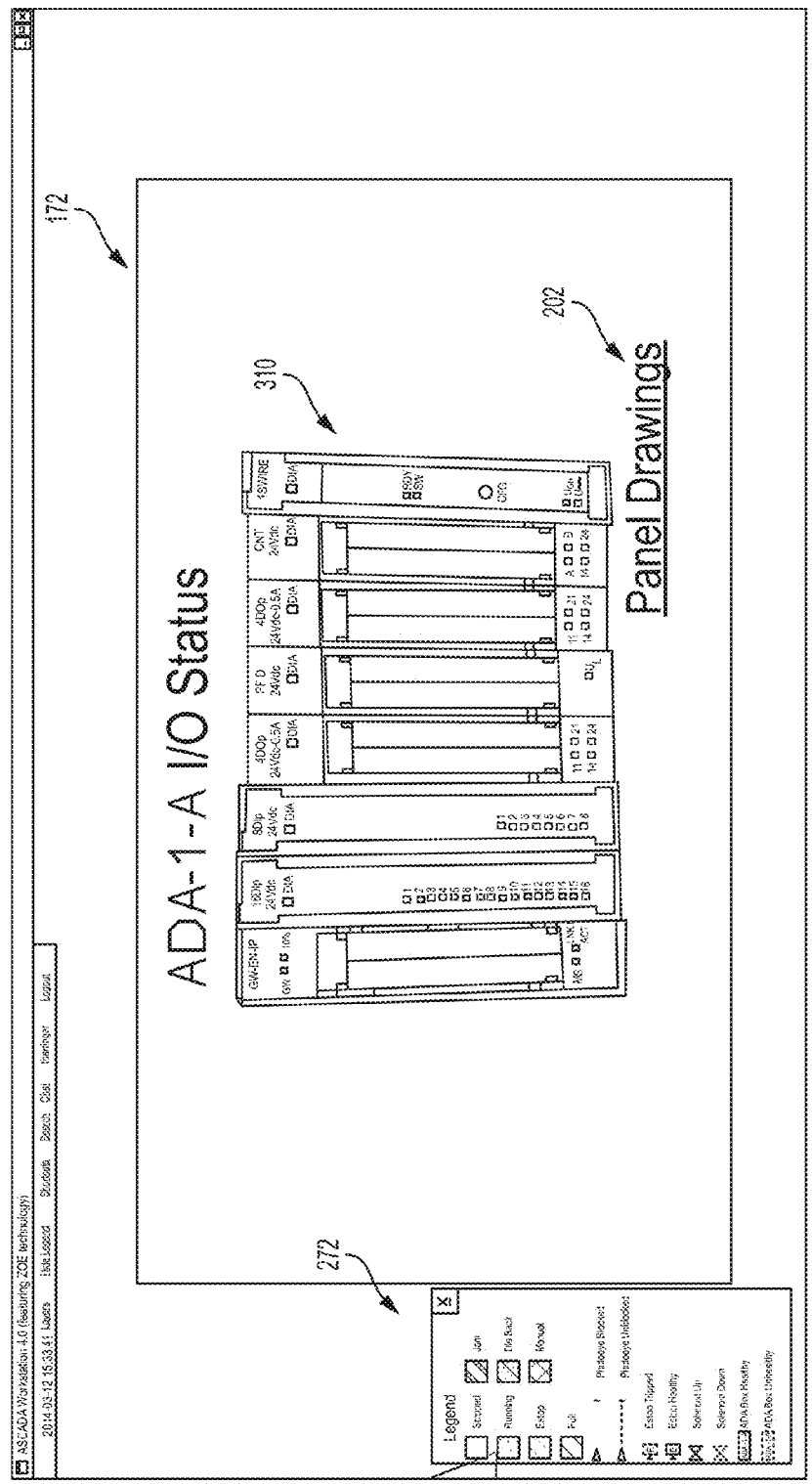
FIG. 24 illustrates the process graphics portion of FIG. 23 further zoomed in to display additional content including graphical objects and status data associated with the control module of FIG. 23.

Referring to FIG. 21, diagram 138 of FIG. 19 is further zoomed to display icons 290 representing forklifts or other vehicles in the facility. For example, vehicles in the facility include tracking devices that communicate their location to the HMI 16 or PLC 12 of the control system 10 (FIG. 1) in real-time so the vehicle locations can be visually monitored within the display window of the zooming user interface. Referring to FIG. 22, the display window is further zoomed to display icons 300 representing other objects in the facility, such as support pillars and other fixtures in the building. FIG. 23 is another illustration of FIG. 12 including legend 272 and an input 192 for selecting a manual control mode of the corresponding conveyor section or I/O devices controlled by control module ADA-1-A. FIG. 24 illustrates an alternative embodiment of the zoomed portion of FIG. 14. Rather than schematic 200 of FIG. 14 showing the I/O status, a photo 310 or other illustration of the I/O modules of the corresponding control module are illustrated in FIG. 24, and representations of illuminated LEDs of the I/O modules are displayed to indicate the I/O status.

Figure 25:
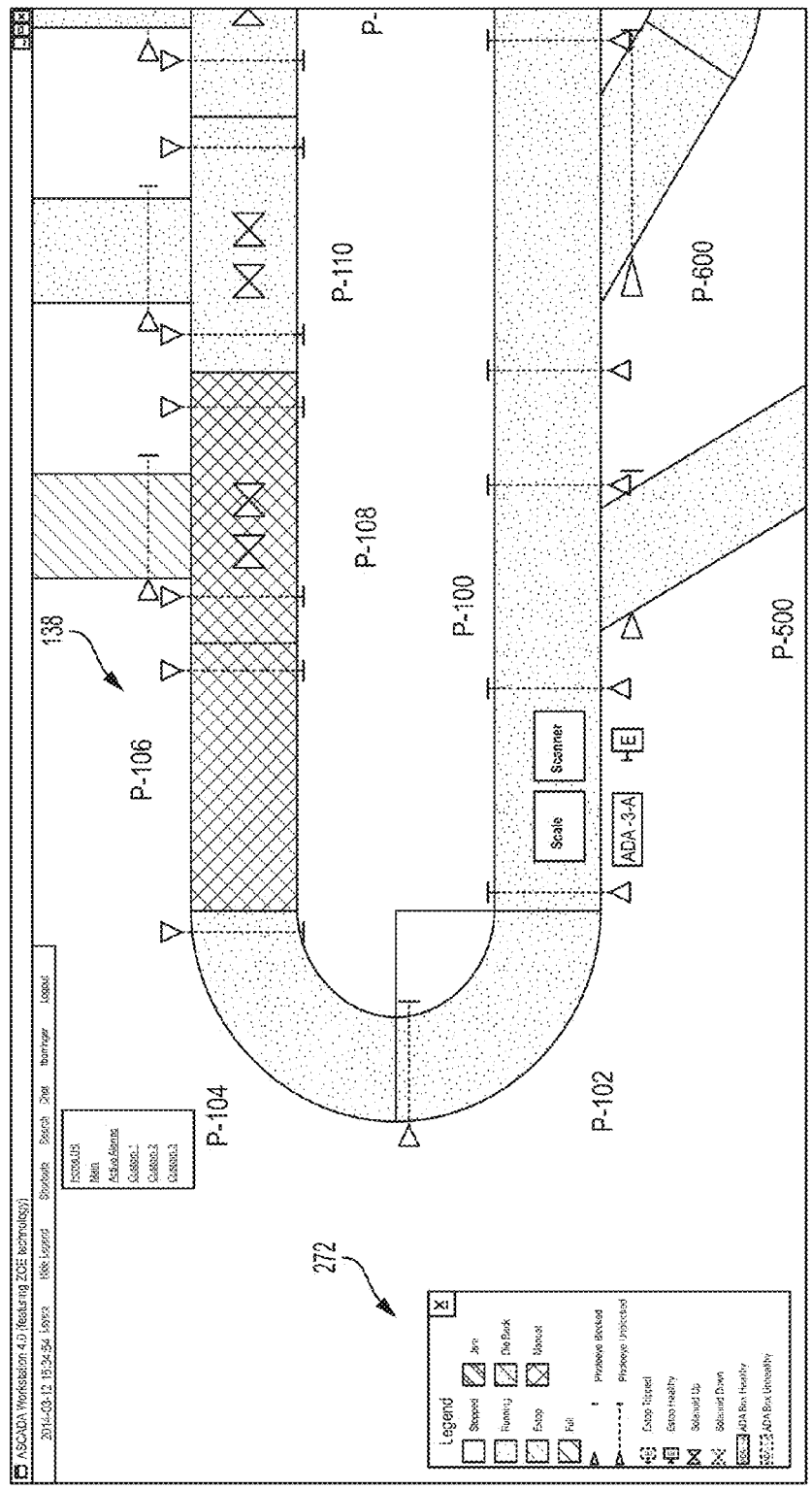
FIG. 25 illustrates the process graphics portion of FIG. 22 further zoomed in to display graphical objects representing scanners, scales, control modules, e-stops, roller motors, and conveyor sections of the material handling system.
Figure 26:
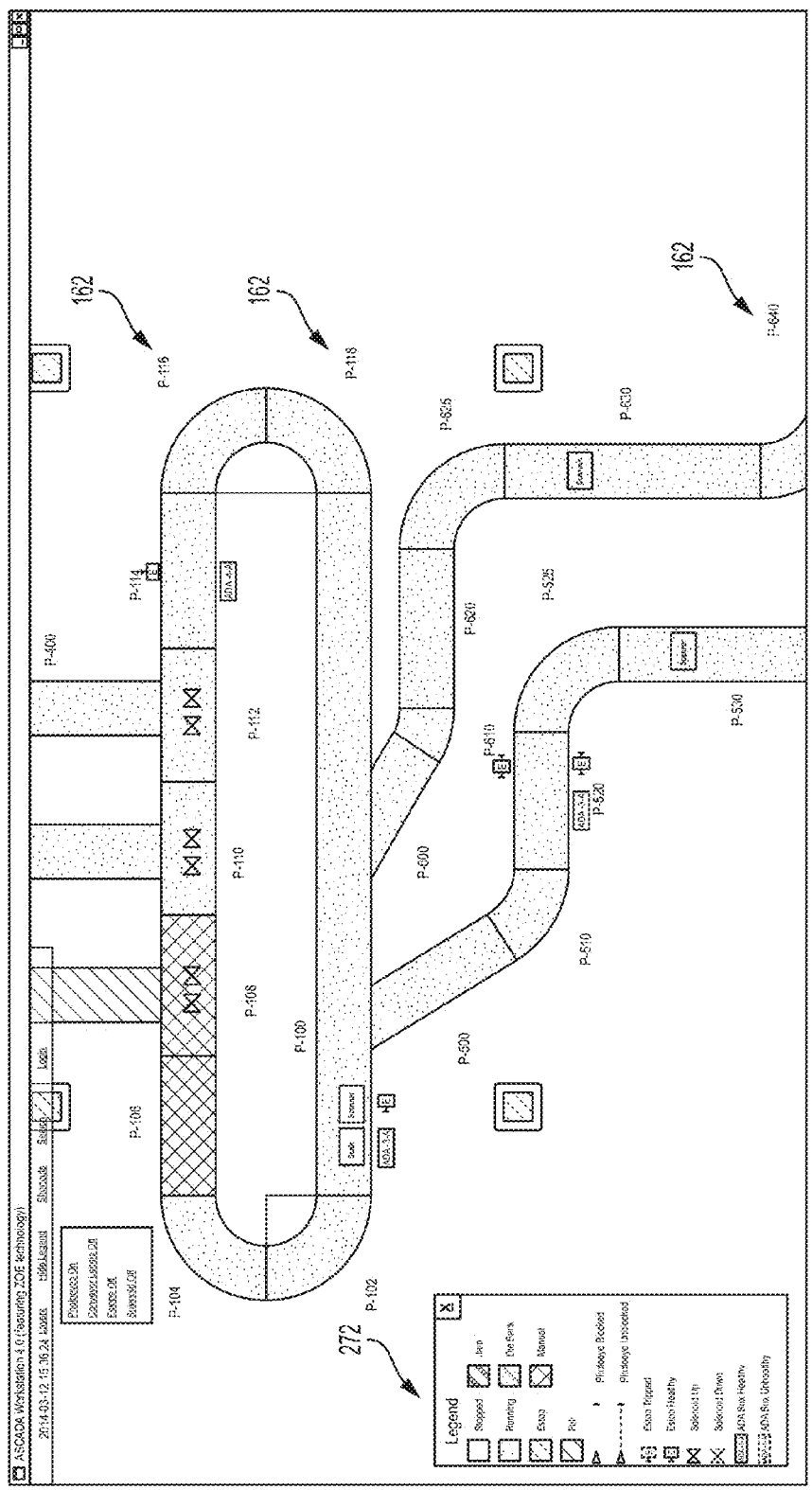
FIG. 26 illustrates the process graphics portion of FIG. 25 further zoomed out to remove some content from display.
Figure 27:
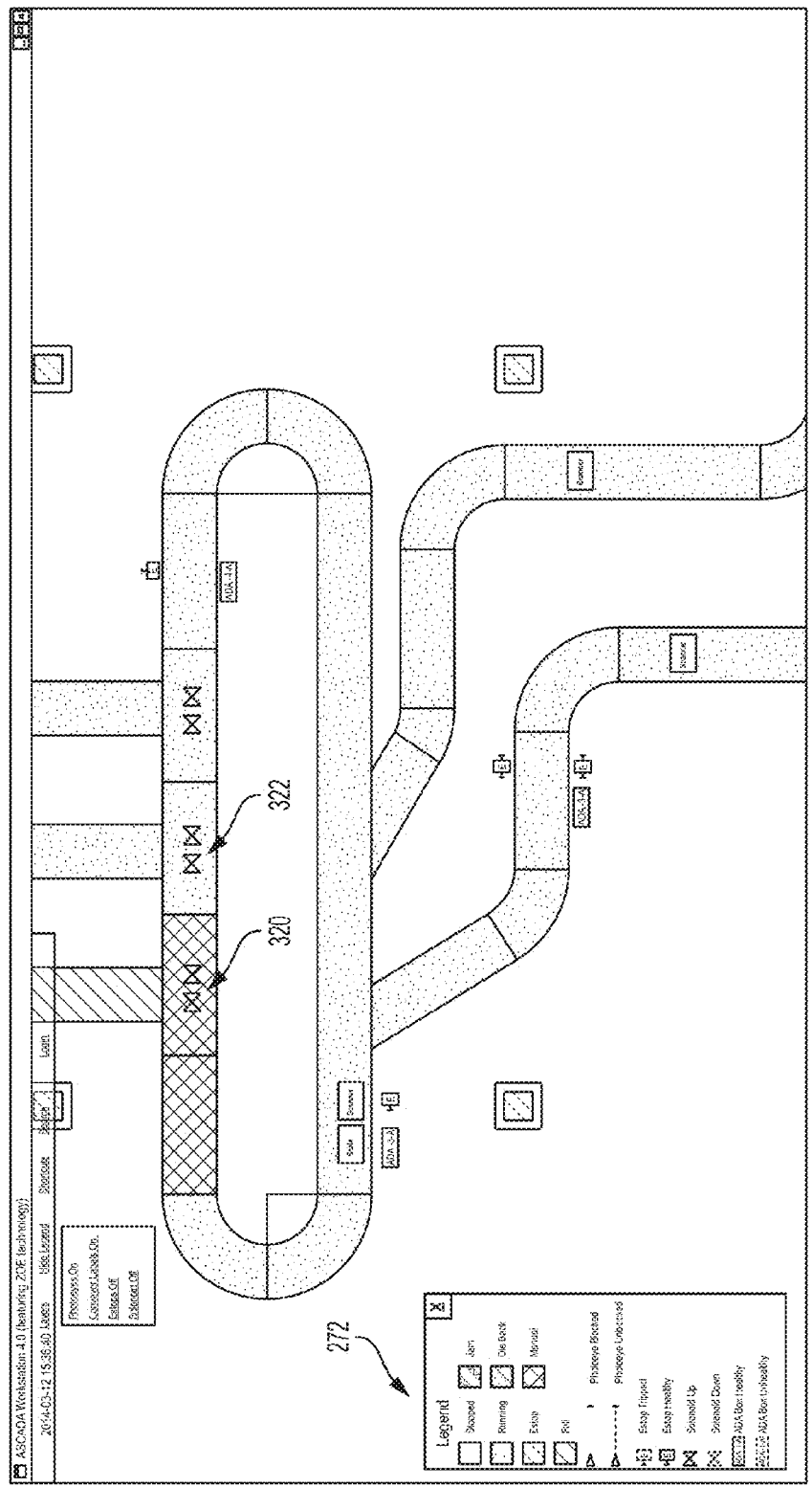
FIG. 27 illustrates the process graphics portion of FIG. 26 further zoomed out to remove some content from display.
Figure 28:
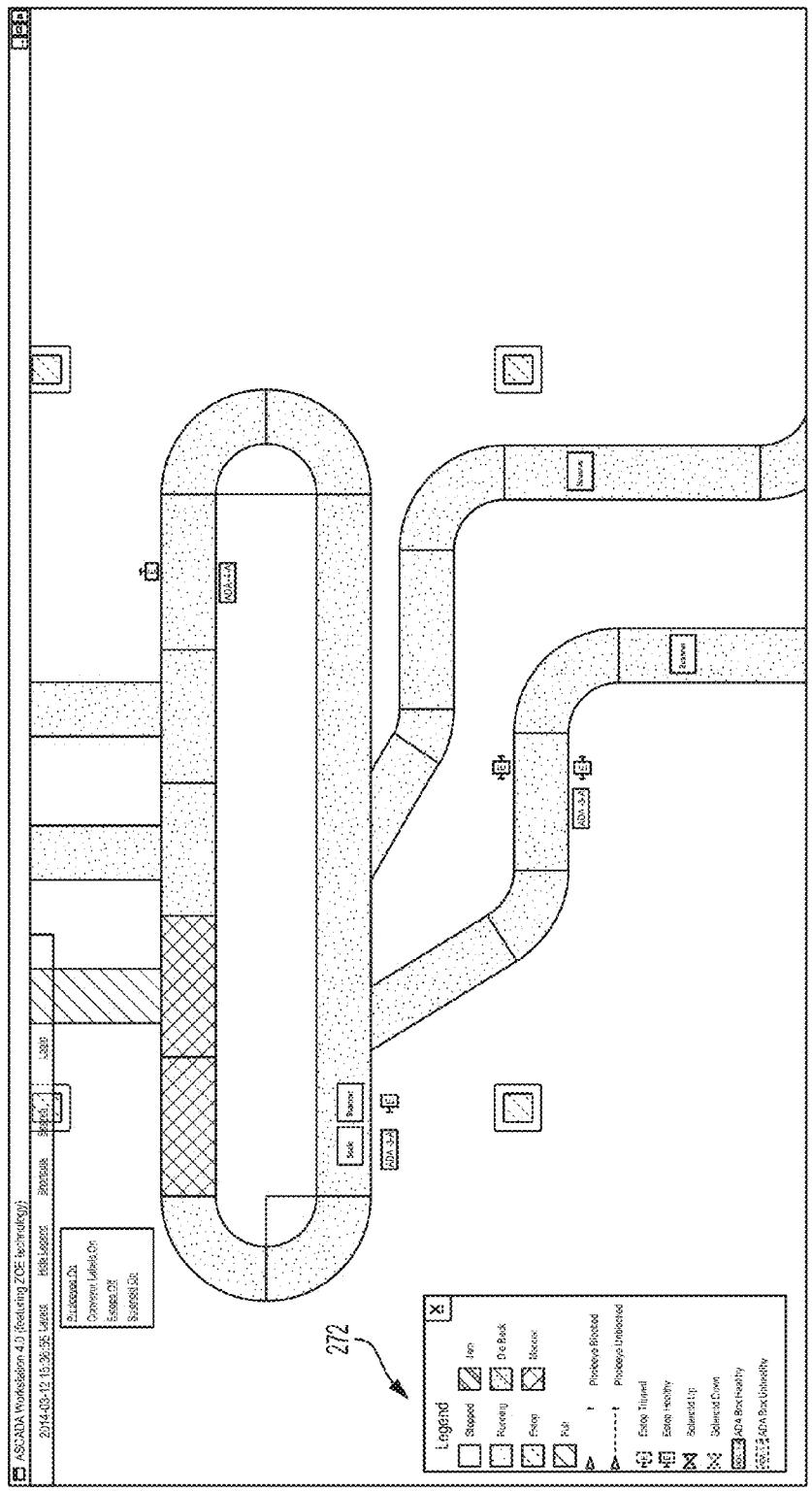
FIG. 28 illustrates the process graphics portion of FIG. 27 further zoomed out to remove some content from display.

FIG. 25 illustrates another exemplary zoomed portion of conveyor diagram 138 of FIG. 19 including icons representing scanners, scales, control modules, e-stops, roller motors, and conveyor sections as well as status information for each represented component. FIGS. 26-28 illustrate the display window of FIG. 25 being progressively zoomed out to different zoom levels, thereby illustrating content being removed from the diagram 138 as the user zooms out and some content being added as the user zooms out, such as different conveyor sections or control system components. For example, the labels 162 for conveyor sections are no longer displayed when transitioning from the zoom level of FIG. 26 to the zoom level of FIG. 27, and icons 320, 322 are no longer displayed when transitioning from the zoom level of FIG. 27 to the zoom level of FIG. 28.

Figure 29:
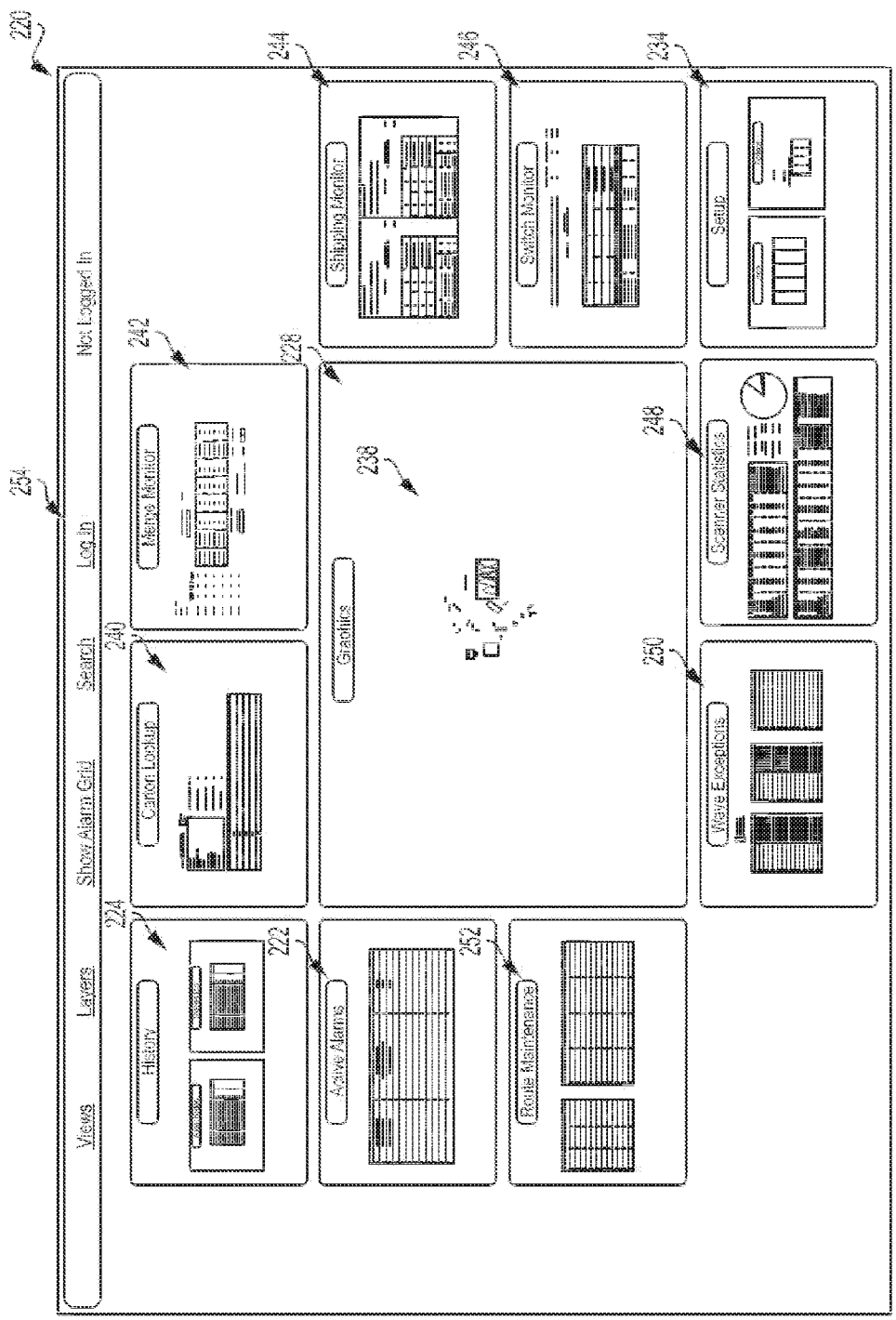
FIG. 29 illustrates another zooming user interface provided by the zooming user interface module of the HMI of FIG. 1, wherein the zooming user interface is fully zoomed out to display in a display area a process graphics portion, an active alarms portion, a history portion, a carton lookup portion, a merge monitor portion, a shipping monitor portion, a switch monitor portion, a setup portion, a scanner statistics portion, a wave exceptions portion, and a routine maintenance portion.

FIGS. 29-39 illustrate another exemplary embodiment of a zooming user interface provided on a display by the ZUI module 28 of FIG. 1. A fully zoomed out display window 220 is illustrated in FIG. 29. Display window 220 includes a representative diagram 238 of another exemplary material handling system in graphics portion 228. Display window 220 further includes an active alarms portion 222, a history portion 224, a carton lookup portion 240, a merge monitor portion 242, a shipping monitor portion 244, a switch monitor portion 246, a setup portion 234, a scanner statistics portion 248, a wave exceptions portion 250, and a routine maintenance portion 252. Using an input device 18 (FIG. 1) such as a keyboard, a mouse, and/or a touchscreen, a user may pan across window 220 in two dimensions and zoom into any objects or areas of interest. By semantic zooming in and out of areas of interest, a user changes the scale of the viewed area in order to see additional detail or less detail. In other words, upon zooming into a particular area of display window 220, additional content or display objects appear in the zoomed portion within display window 220, as described herein. The additional content or objects include visualizations and status data of components of the material handling system, selectable control inputs, modifiable fields and tables, and/or other suitable objects.

Zoomable display window 220 of FIGS. 29-39 further includes selectable inputs 254 positioned at the top of the window. In the illustrated embodiment, these inputs 254 remain at the top of the display window 220 regardless of the zoom level or zoomed area. Inputs 254 allow a user to select saved views of the display area, including accessing quick links (e.g., hyperlinks) that route to previously saved views or to portions 228, 222, 224, 240, 242, 244, 246, 234, 248, 250, 252. For example, a user may select the Views tab to select and cause the display of a previously saved zoomed view of a particular conveyor section of the material handling system. Inputs 254 further include a Layers tab for selectively displaying and hiding graphical objects representing particular components of the material handling system. For example, when zoomed into diagram 238, the user may via the Layers tab selectively show/hide the graphical objects representing control system components such as photo-eyes, motors, control modules, scanners, and other suitable components. Inputs 254 further include a Show/Hide Alarm Grid input for selectively displaying and hiding a list of current alarms of the material handling system. Inputs 254 further include a Search tab for searching for a particular component, part, or user and a Log In tab for logging in as a registered user.

Still referring to FIG. 29, increasing the zoom level of active alarms portion 222 causes the display of an active alarms window similar to window 140 of FIG. 5 that displays a list of current alarm messages. Zooming into history portion 224 causes the display of alarm and system log histories similar to alarm history portion 124 and system log portion 126 of FIG. 4. Zooming into setup portion 234 causes the display of a system setup window similar to setup window 210 of FIG. 15.

Figure 30:
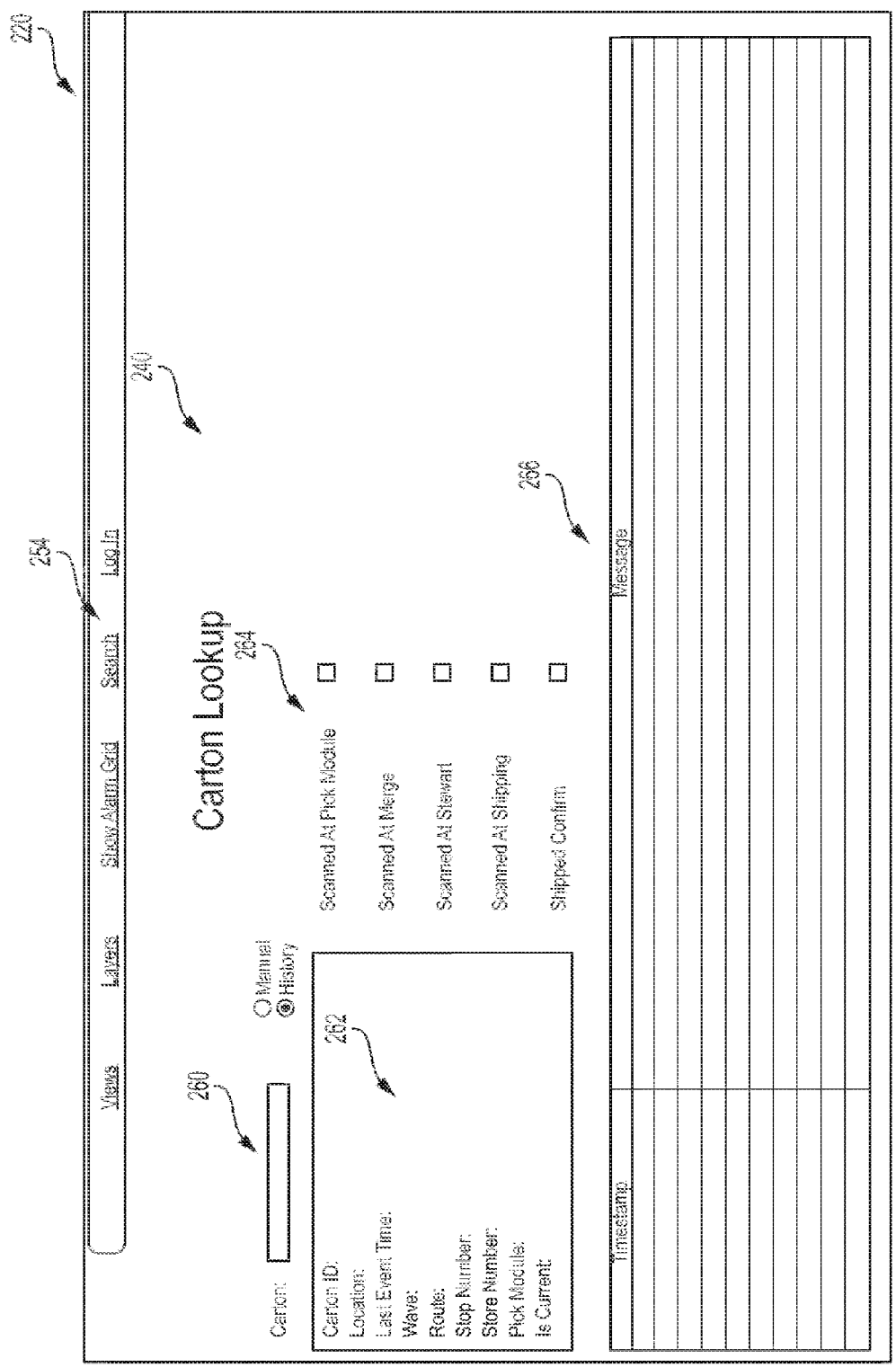
FIG. 30 illustrates the zooming user interface of FIG. 29 zoomed in to the carton lookup portion.

Zooming into carton lookup portion 240 of FIG. 29 causes the zoomed display of FIG. 30 in the display window 220. The zoomed carton lookup portion 240 includes a fillable field 260 for entering an ID number for a carton (or other item) of interest. An information field 262 displays status data related to the identified carton, and field 264 provides an indication of the locations on the material handling system where the carton was scanned (e.g., pick module, merge area, horizontal switch section, shipping, etc.). A message table 266 displays status messages, such as alarms for example, related to the identified carton. Other suitable items besides cartons may be looked up with portion 240, including any item or object handled by the material handling system.

Zooming into merge monitor portion 242 of FIG. 29 causes the zoomed display of FIG. 31 in the display window 220. In FIG. 31, status information related to the merging area of the conveyor lanes is provided, such as the merged lanes illustrated in FIG. 37. A table 274 and indicators 272, 276 provide status data for the merged lanes. Selectable data is displayed including auto/manual mode 270 and tolerance values for carton read errors in the merging areas of the conveyors.

Figure 32:
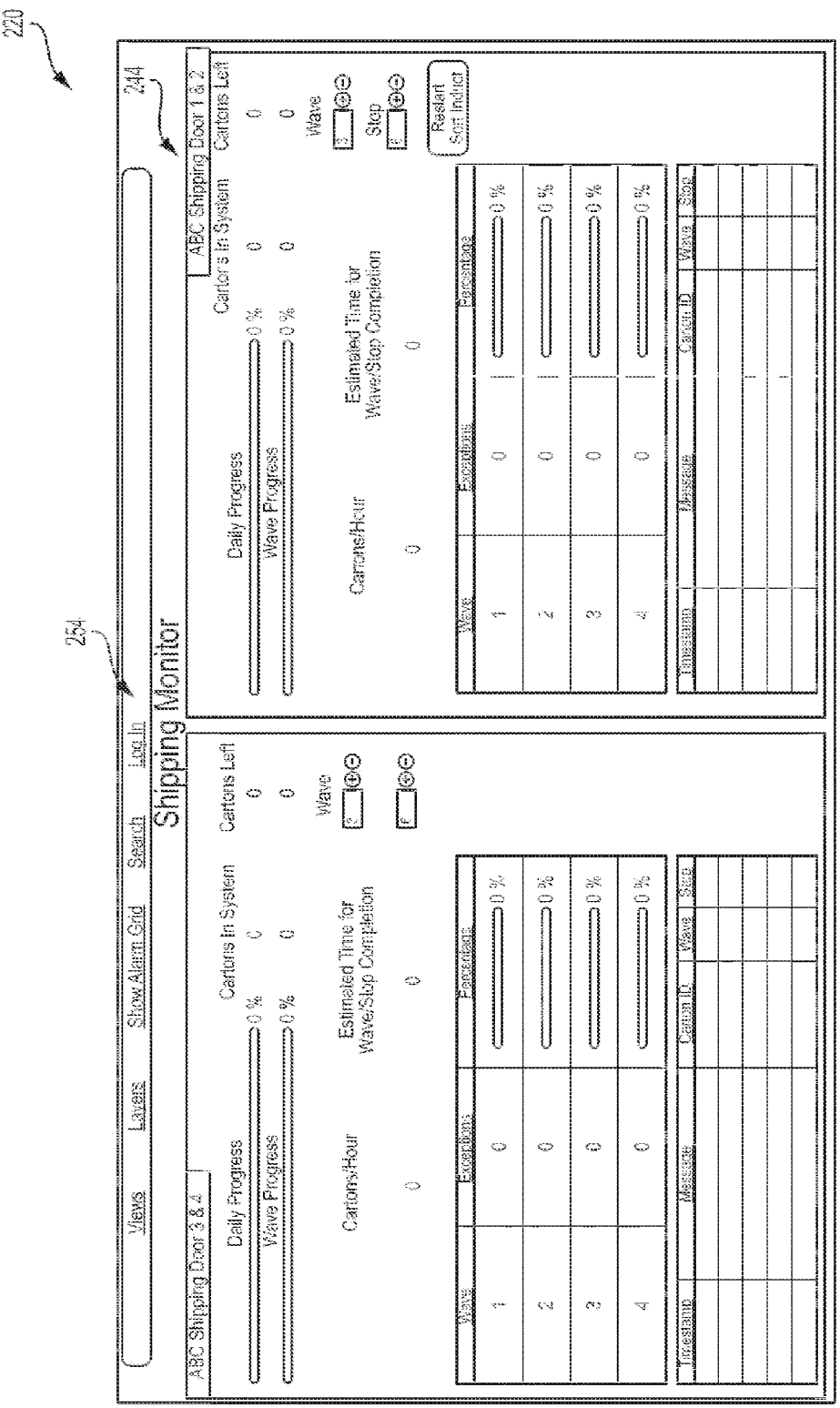
FIG. 32 illustrates the zooming user interface of FIG. 29 zoomed in to the shipping monitor portion.
Figure 33:
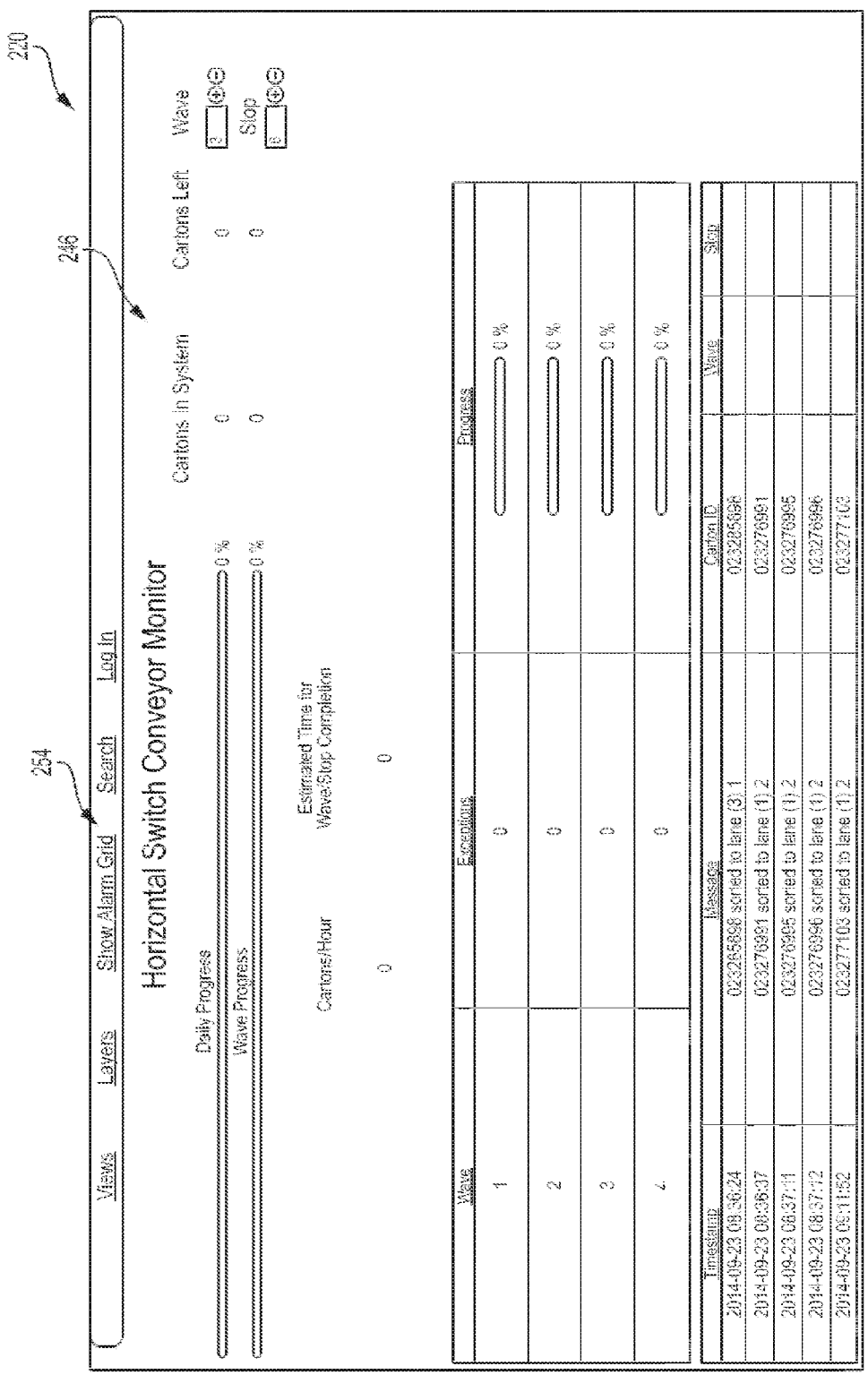
FIG. 33 illustrates the zooming user interface of FIG. 29 zoomed in to the switch monitor portion.
Figure 34:
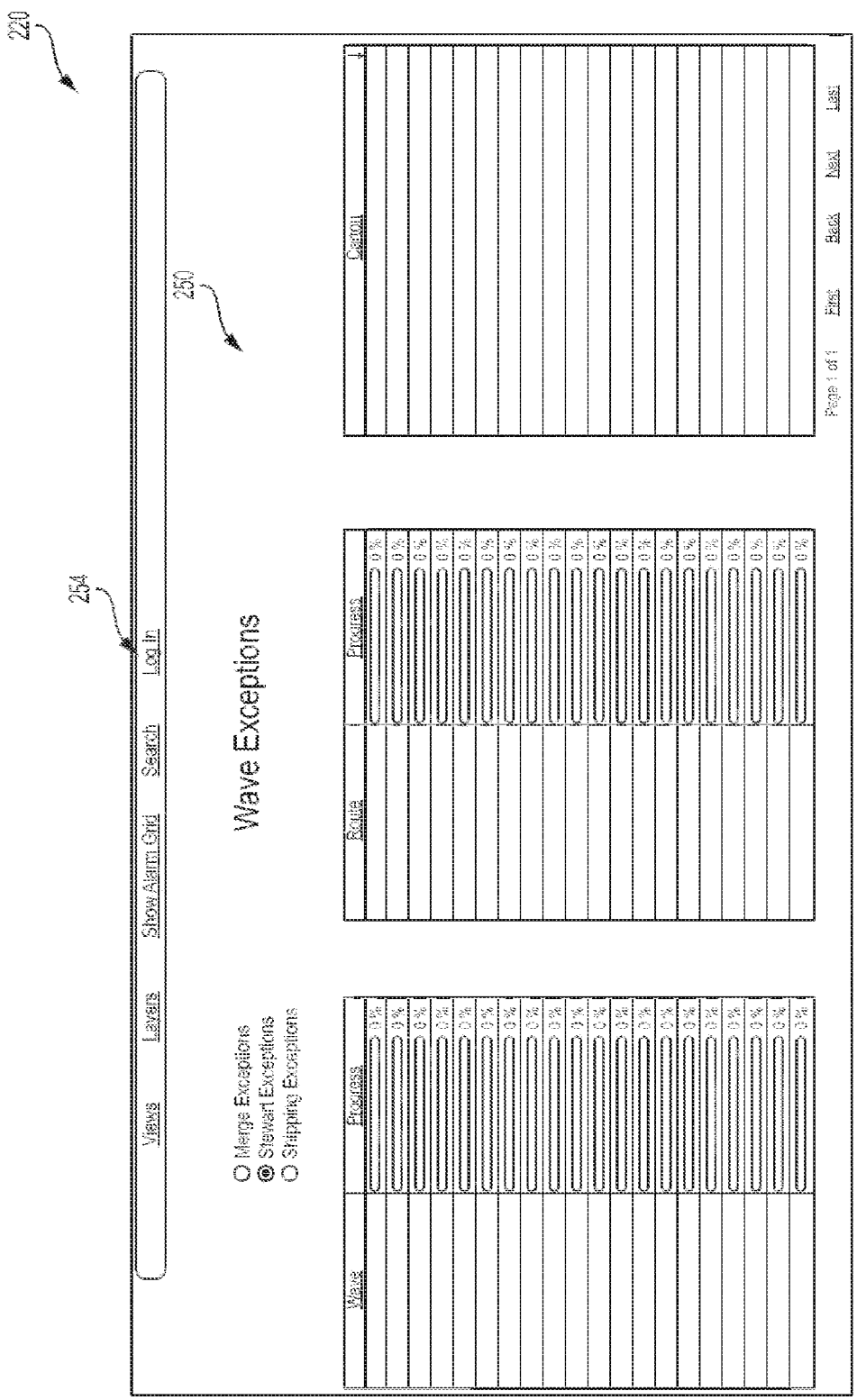
FIG. 34 illustrates the zooming user interface of FIG. 29 zoomed in to the wave exceptions portion.

Zooming into shipping monitor portion 244 of FIG. 29 causes the zoomed display of FIG. 32 in the display window 220. In FIG. 32, status data is displayed for monitoring various aspects of shipping, including the number of cartons or pallets ready for shipping and the number remaining at different shipping locations of the facility. Zooming into the horizontal switch conveyor portion 246 of FIG. 29 causes the zoomed display of FIG. 33 in the display window 220 for monitoring a switching area. In FIG. 33, status data is displayed for the switching area of the conveyor system, such as the switching area illustrated in FIG. 39 where items on a conveyor lane are diverted to multiple downstream conveyor lanes. Zooming into the wave exceptions portion 250 of FIG. 29 causes the zoomed display of FIG. 34 in the display window 220. In FIG. 34, tables are displayed listing the wave exceptions, which include cartons or items that were not routed properly on areas of the conveyor system. The listing of cartons is sortable by location, such as at the merging lanes, the horizontal switch conveyor area (Stewart switch), and the shipping area.

Process graphics portion 228 of FIG. 29 includes a schematic or representative diagram 138 of the physical layout of a material handling system, illustratively from a top-down or "birds-eye" perspective. In the illustrated embodiment, the visualizations of each component of the material handling system are arranged in the diagram 238 according to the physical arrangement of the components in the physical material handling system of the facility. As a user zooms into process graphics portion 228, additional detail of the components of the material handling system and associated controls and information is displayed with diagram 238 in the display window 220. For example, FIG. 35 illustrates process graphics portion 228 after an initial amount of zooming, and FIG. 37 illustrates process graphics portion 228 after further zooming into a particular area (e.g., merging area) of the diagram 238.

Figure 35:
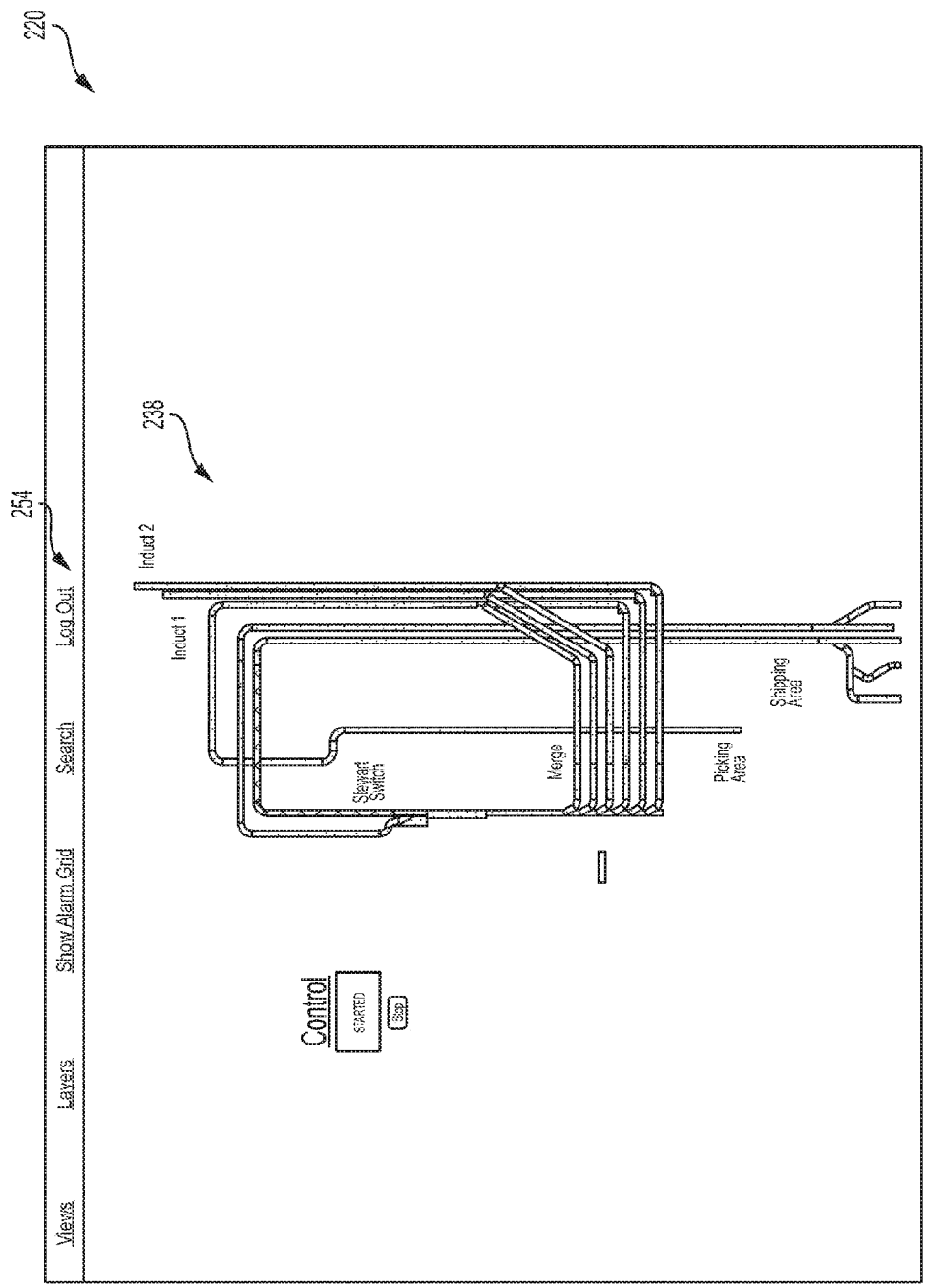
FIG. 35 illustrates the zooming user interface of FIG. 29 zoomed in to the process graphics portion and displaying a graphical representation of the material handling system along with status data.
Figure 36:
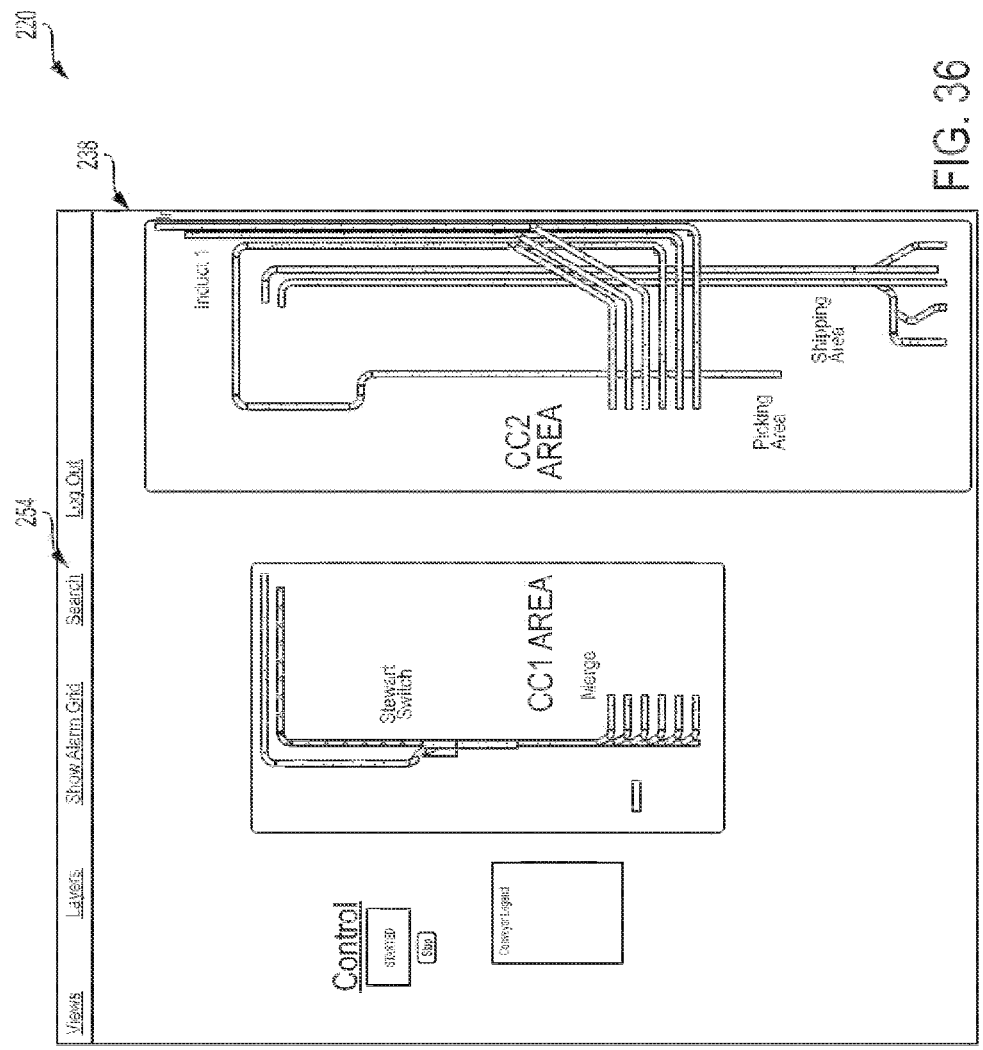
FIG. 36 illustrates the process graphics portion of FIG. 35 further zoomed in to display additional content, wherein the graphical representation is split to display overlapping conveyor sections separately.

In one embodiment, the material handling system diagram 238 of FIG. 35 automatically splits into two portions as further zooming occurs to fully display different conveyor areas, as illustrated in FIG. 36. For example, the diagram 238 may split due to the conveyors physically overlapping each other at different elevations, thereby allowing the representations of the overlapping conveyor sections to be fully displayed in the diagram 238 to provide visual clarity. Alternatively, overlapping portions of conveyors and other objects are displayed as translucent graphical objects to show overlapping portions of the material handling system.

Figure 37:
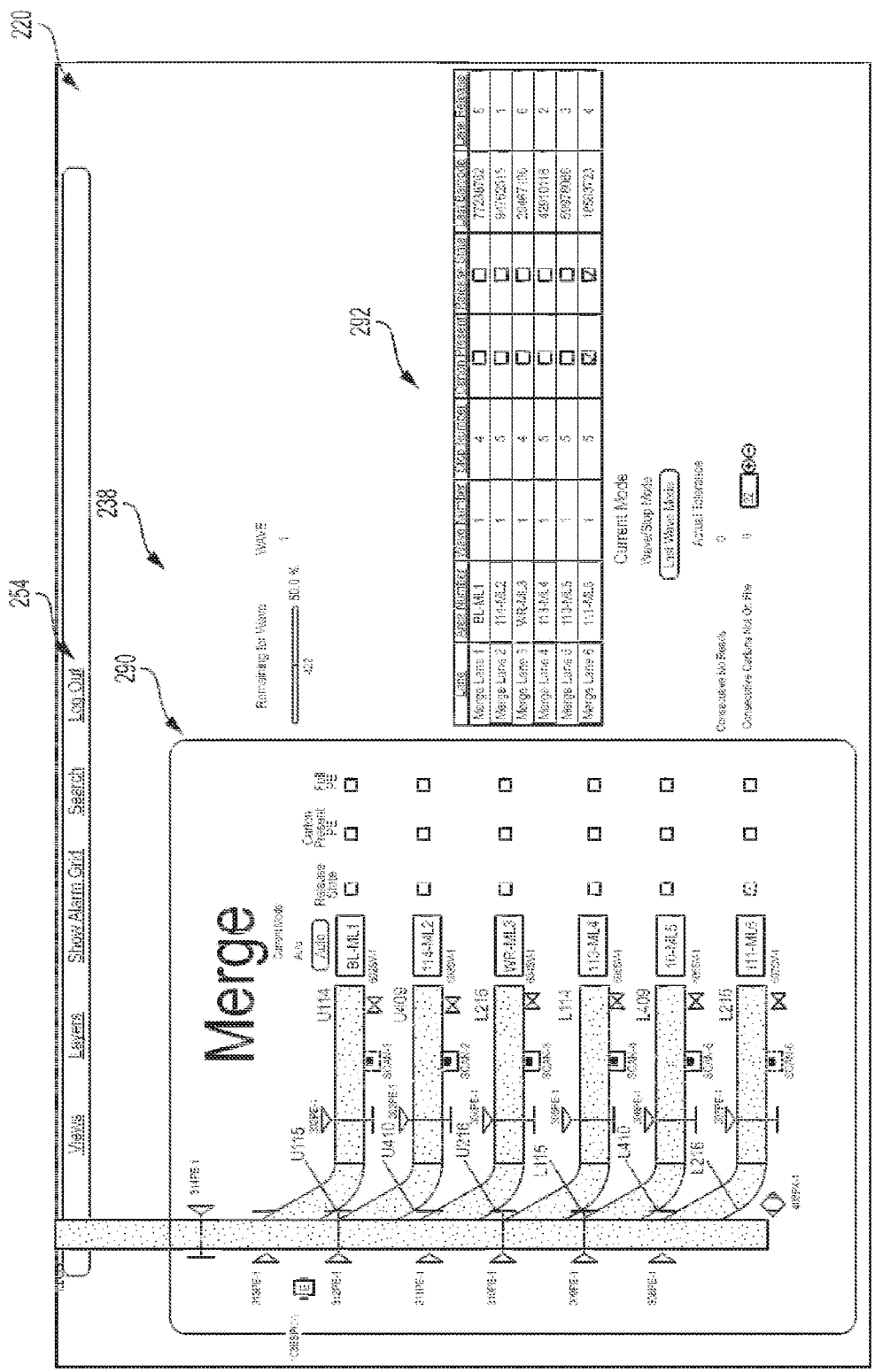
FIG. 37 illustrates the process graphics portion of FIG. 36 further zoomed in to display additional content of a merging area of the material handling system.

In FIG. 37, a particular area of diagram 138 of FIG. 35, illustratively the conveyor merging area, is further zoomed to display graphical objects/icons representing additional components of the material handling system, including photo-eyes, conveyor section labels, roller motors, scanner modules, proximity switches, and other suitable control system components. Status information is displayed with the displayed objects, including the blocked or unblocked state of the photo-eyes, for example. A table 292 displays status information related to each merging conveyor lane. As such, additional objects representing the component layout of the material handling system are displayed by zooming into diagram 238.

Figure 38:
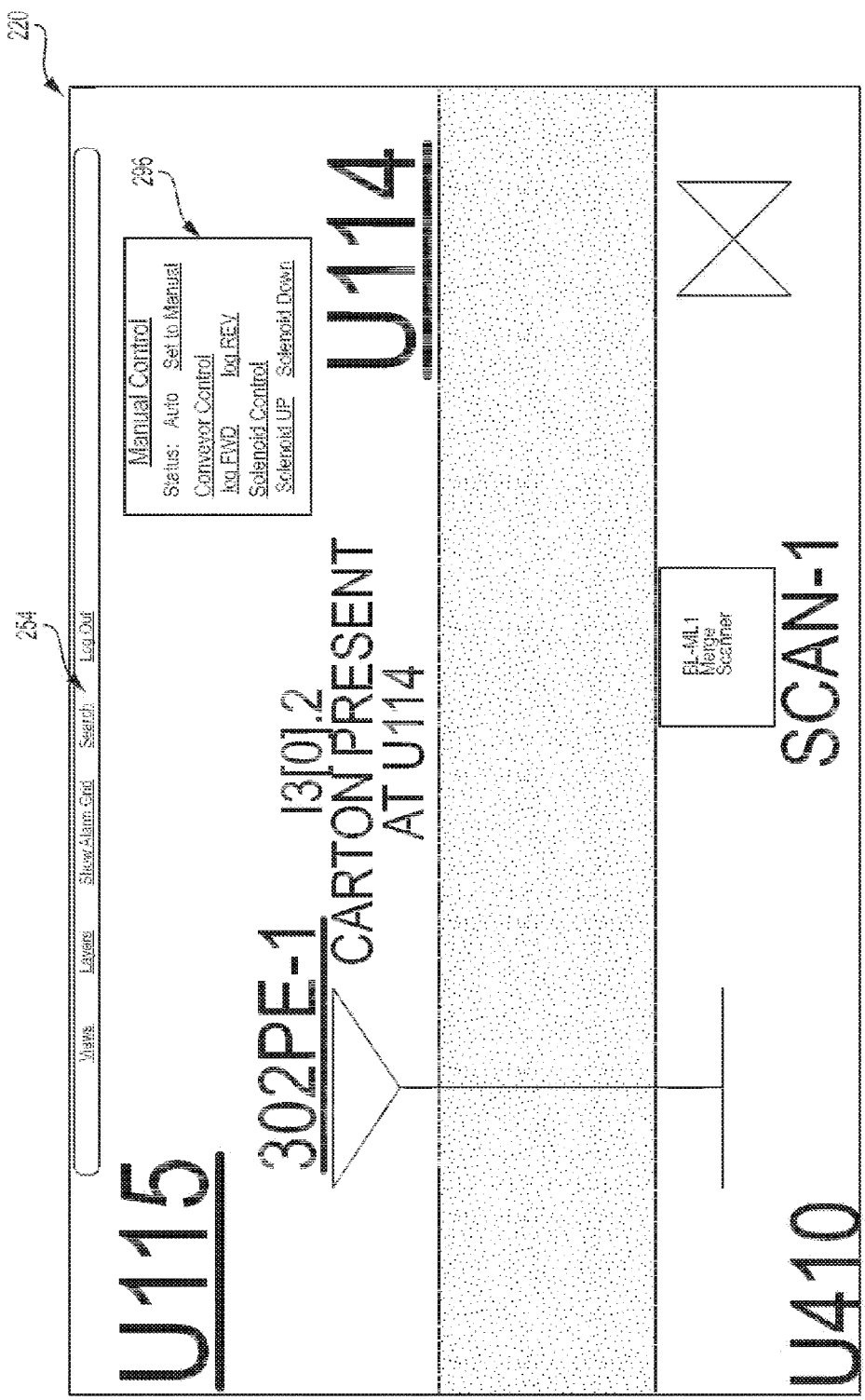
FIG. 38 illustrates the process graphics portion of FIG. 37 further zoomed in to a conveyor section of the material handling system to display additional content.
Figure 39:
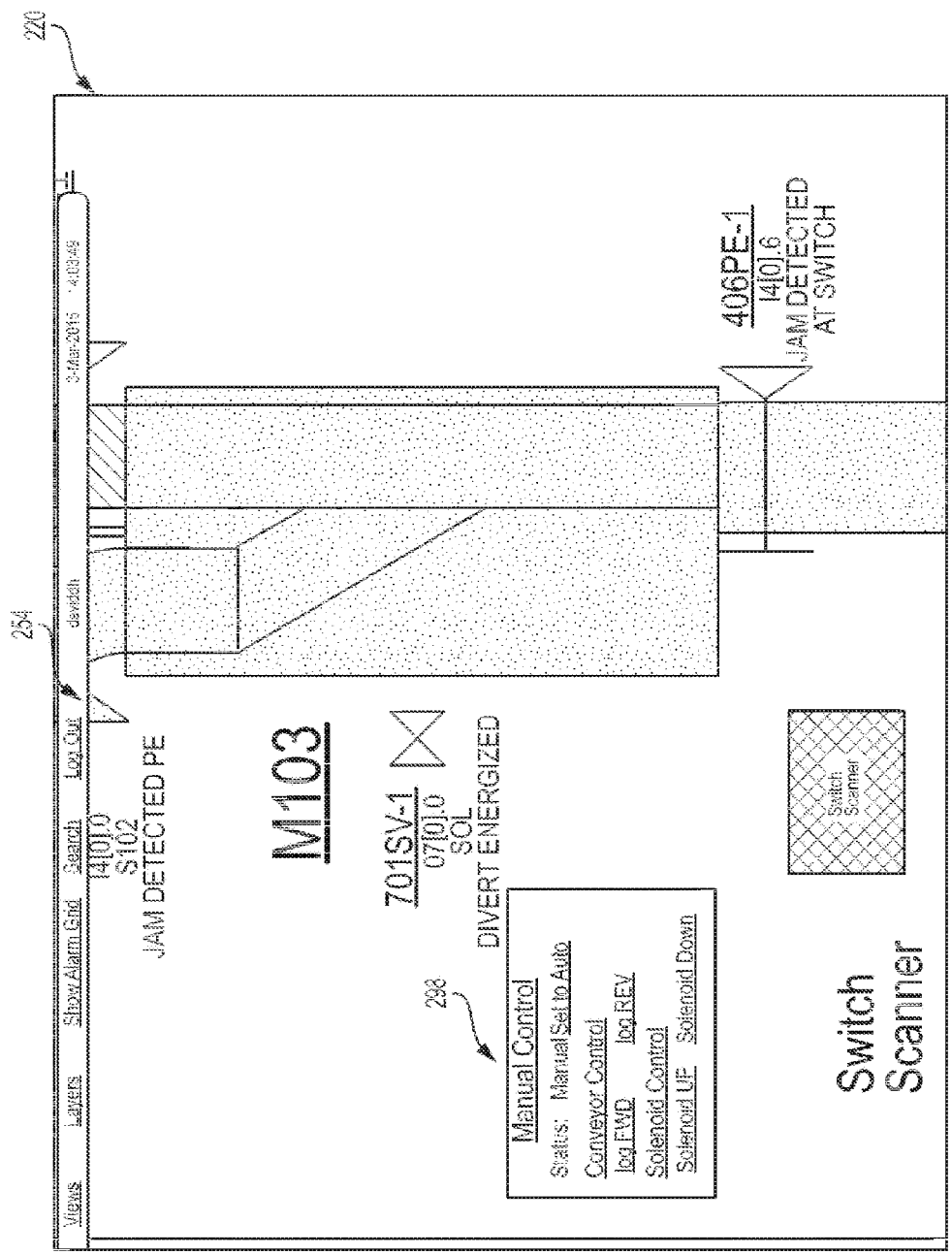
FIG. 39 illustrates the process graphics portion of FIG. 36 further zoomed in to display additional content of a switching area of the material handling system.

Upon zooming into conveyor section U114 of FIG. 37, detailed status information and additional selectable control inputs related to the conveyor section U114 are displayed, as illustrated in FIG. 38. Similarly, upon zooming into conveyor merging section M103 of FIG. 35, detailed status information and additional selectable control inputs related to the conveyor section M103 are displayed, as illustrated in FIG. 39. For example, selectable inputs 296, 298 of FIGS. 38 and 39 provide manual controls to allow a user to jog the conveyor section forward or backwards and to control one or more solenoids at that section.

Figure 40:
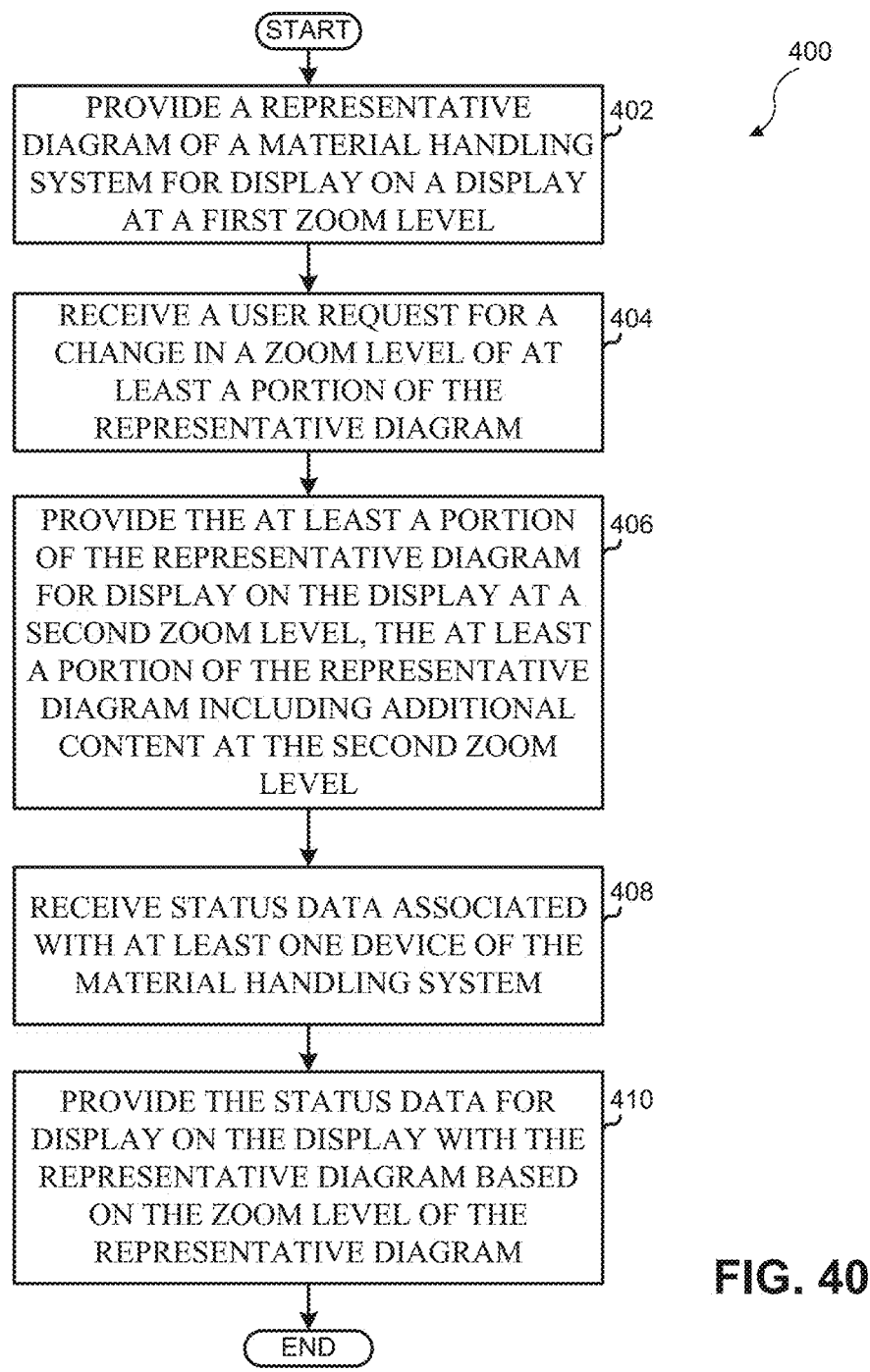
FIG. 40 is a flow chart of an exemplary method of operation of the zooming user interface module of the HMI of FIG. 1 for providing and controlling a zooming user interface on a display.

FIG. 40 illustrates a flow diagram 400 of an exemplary operation performed by ZUI module 28 of FIG. 1 for providing and controlling a zooming user interface. Reference is made to FIG. 1 throughout the description of FIG. 29. At block 402, ZUI module 28 provides a representative diagram 138 (FIG. 4) of a material handling system 10 for display on a display 22 at a first zoom level. At block 404, module 28 receives a user request via user input device 18 for a change in a zoom level of at least a portion of the representative diagram 138. A user identifies an area of the displayed diagram 138 for zooming into, such as the area near scanner 170 of FIG. 10, for example. At block 406, in response to receiving the user request, ZUI module 28 provides the at least a portion of the representative diagram 138 of the material handling system for display on the display 22 at a second zoom level, wherein the at least a portion of the representative diagram 138 includes additional content at the second zoom level. For example, the area around scanner 170 selected in FIG. 10 is displayed at a second zoom level with more displayed content in FIG. 11. At block 408, ZUI module 28 receives status data associated with at least one device of the material handling system 10, such as devices 12, 14, 20 of FIG. 1. At block 410, ZUI module 28 provides the status data for display on the display 22 with the representative diagram 138 based on the zoom level of the representative diagram 138. See, for example, the status data provided in FIG. 11 for the scanner 170, including the recent scan photo 182 and the data in tables 186, 188.

The term "logic" or "module" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

The disclosed operations set forth herein may be carried out by one or more suitable processors that are in communication with non-transitory computer readable medium such as but not limited to CDROM, RAM, other forms of ROM, hard drives, distributed memory, etc. The non-transitory computer readable medium stores executable instructions that when executed by the one or more processors cause the one or more processors to perform, for example, the operations of HMI 16 of FIG. 1 described herein.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains.

What is claimed is:

1. A method carried out by at least one processor, the method including:
   providing a representative diagram of a material handling system for display on a display, the representative diagram including a first zoom level illustrating a first portion of the representative diagram, a second zoom level illustrating a second portion of the representative diagram smaller than the first portion of the representative diagram, and a plurality of intermediate zoom levels between the first zoom level and the second zoom level;
   displaying on the display the first portion of the representative diagram at the first zoom level;
   receiving a user request for a change in a zoom level of the representative diagram to the second zoom level, the user request comprising either a zoom request or selecting an area of the representative diagram;
   in response to receiving the user request, determining whether the user request is the zoom request or selecting an area of the representative diagram, and displaying on the display, in a manner according to which user request is received, the second portion of the representative diagram at the second zoom level;
   receiving status data associated with at least one device of the material handling system;
   providing at the first zoom level a first set of content for display on the display with the first portion of the representative diagram; and
   providing at the second zoom level a second set of content for display on the display with the second portion of the representative diagram, the second set of content including the status data;
   wherein, when the user request is the zoom request, the representative diagram displayed on the display gradually transitions from the first zoom level to the second zoom level passing through the plurality of intermediate zoom levels, and, when the user request is selecting the area of the representative diagram, the representative diagram displayed on the display jumps from the first zoom level to the second zoom level.

2. The method of claim 1, wherein the second set of content includes a graphical object representative of at least one device of the material handling system.

3. The method of claim 2, wherein the second set of content further includes at least one of a selectable control input and status data associated with the graphical object.

4. The method of claim 1, further including, when the representative diagram displayed on the display is at the first zoom level, providing for display on the display at least one of an alarm data window and a system setup data window, wherein the representative diagram and the at least one of the alarm data window and the system setup data window each occupy a different portion of the display.

5. The method of claim 4, further including, when the representative diagram displayed on the display is at the second zoom level, removing the at least one of the alarm data window and the system setup data window from the display.

6. The method of claim 1, wherein the status data is provided by at least one programmable logic controller of the material handling system in communication with the at least one processor.

7. The method of claim 1, wherein the representative diagram includes graphical data representing a conveyor of the material handling system.

8. The method of claim 1, further including receiving user input for controlling at least one device of the material handling system, and outputting control data for controlling the at least one device based on the user input.

9. The method of claim 1, wherein the representative diagram includes a top-down graphical view of the material handling system.

10. A system including:
    a display; and
    at least one processor in communication with the display, the at least one processor being operative to:
       provide a representative diagram of a material handling system for display on the display, the representative diagram including a first zoom level illustrating a first portion of the representative diagram, a second zoom level illustrating a second portion of the representative diagram smaller than the first portion of the representative diagram, and a plurality of intermediate zoom levels between the first zoom level and the second zoom level,
       display on the display the first portion of the representative diagram at the first zoom level,
       receive a user request for a change in a zoom level of the representative diagram to the second zoom level, the user request comprising either a zoom request or selecting an area of the representative diagram, in response to receiving the user request, determine whether the user request is the zoom request or selecting an area of the representative diagram, and displaying on the display, in a manner according to which user request is received, the second portion of the representative diagram at the second zoom level, receive status data associated with at least one device of the material handling system, provide at the first zoom level a first set of content for display on the display with the first portion of the representative diagram, and provide at the second zoom level a second set of content for display on the display with the second portion of the representative diagram, the second set of content including the status data, wherein, when the user request is the zoom request, the representative diagram displayed on the display gradually transitions from the first zoom level to the second zoom level passing through the plurality of intermediate zoom levels, and, when the user request is selecting the area of the representative diagram, the representative diagram displayed on the display jumps from the first zoom level to the second zoom level.

11. The system of claim 10, wherein the second set of content includes graphical object representative of at least one device of the material handling system.

12. The system of claim 11, wherein the second set of content further includes at least one of a selectable control input and status data associated with the graphical object.

13. The system of claim 10, wherein, when the representative diagram displayed on the display is at the first zoom level, the at least one processor is further operative to provide for display on the display at least one of an alarm data window and a system setup data window, wherein the representative diagram and the at least one of the alarm data window and the system setup data window each occupy a different portion of the display.

14. The system of claim 1, further including a communication interface operatively coupled to the at least one processor, wherein the status data is provided by at least one programmable logic controller of the material handling system in communication with the at least one processor via the communication interface.

15. The system of claim 1, wherein the representative diagram includes graphical data representing a conveyor of the material handling system.

16. A non-transitory computer-readable medium comprising:

executable instructions such that when executed by at least one processor cause the at least one processor to:

provide a representative diagram of a material handling system for display on a display, the representative diagram including a first zoom level illustrating a first portion of the representative diagram, a second zoom level illustrating a second portion of the representative diagram smaller than the first portion of the representative diagram, and a plurality of intermediate zoom levels between the first zoom level and the second zoom level, display on the display the first portion of the representative diagram at the first zoom level, receive a user request for a change in a zoom level of the representative diagram to the second zoom level, the user request comprising either a zoom request or selecting an area of the representative diagram, in response to receiving the user request, determine whether the user request is a the zoom request or selecting an area of the representative diagram, and displaying on the display, in a manner according to which user request is received, the second portion of the representative diagram at the second zoom level, receive status data associated with at least one device of the material handling system, provide at the first zoom level a first set of content for display on the display with the first portion of the representative diagram, and provide at the second zoom level a second set of content for display on the display with the second portion of the representative diagram, the second set of content including the status data, wherein, when the user request is the zoom request, the representative diagram displayed on the display gradually transitions from the first zoom level to the second zoom level passing through the plurality of intermediate zoom levels, and, when the user request is selecting the area of the representative diagram, the representative diagram displayed on the display jumps from the first zoom level to the second zoom level.

17. The non-transitory computer-readable medium of claim 16, wherein the second set of content includes a graphical object representative of at least one device of the material handling system.

18. The non-transitory computer-readable medium of claim 17, wherein the second set of content further includes at least one of a selectable control input and status data associated with the graphical object.

19. The non-transitory computer-readable medium of claim 16, wherein the status data is provided by at least one programmable logic controller of the material handling system in communication with the at least one processor via a communication interface.

20. The non-transitory computer-readable medium of claim 16, wherein the representative diagram includes graphical data representing a conveyor of the material handling system.

21. The method of claim 1, wherein, when the user request is the zoom request, the representative diagram displayed on the display gradually transitions from the first zoom level to the second zoom level by semantic zooming.

22. The system of claim 10, wherein, when the user request is the zoom request, the representative diagram displayed on the display gradually transitions from the first zoom level to the second zoom level by semantic zooming.

23. The non-transitory computer-readable medium of claim 16, wherein, when the user request is a zoom request, the representative diagram displayed on the display gradually transitions from the first zoom level to the second zoom level by semantic zooming.

24. The method of claim 1, further comprising editing the second portion of the representative diagram while providing the second portion of the representative diagram of the material handling system for display on the display at the second zoom level.

25. The system of claim 10, wherein the system is configured to edit the second portion of the representative diagram of the material handling system while providing the second portion of the representative diagram of the material handling system for display on the display at the second zoom level.

26. The non-transitory computer-readable medium of claim 16, further comprising editing the second portion of the representative diagram while providing the second portion of the representative diagram of the material handling system for display on the display at the second zoom level.

* * * * *

UNITED STATES PATENT AND TRADEMARK OFFICE
CERTIFICATE OF CORRECTION

PATENT NO. : 10,261,670 B2
APPLICATION NO. : 14/659438
DATED : April 16, 2019
INVENTOR(S) : David den Haring et al.

Page 1 of 1

It is certified that error appears in the above-identified patent and that said Letters Patent is hereby corrected as shown below:

In the Claims

Claim 11, Column 17, Line 29, replace "includes graphical" with "includes a graphical"

Claim 16, Column 18, Line 4, replace "request is a the" with "request is the"

Signed and Sealed this
Twenty-eighth Day of May, 2019

Andrei Iancu
*Director of the United States Patent and Trademark Office*